United States Patent
Hasebe et al.

[11] Patent Number: 5,241,609
[45] Date of Patent: * Aug. 31, 1993

[54] MARKER COLOR CONVERSION APPARATUS FOR COLOR IMAGE PROCESSING DEVICE

[75] Inventors: Takashi Hasebe; Seiichiro Hiratsuka; Tadao Kishimoto; Koji Washio; Tetsuya Niitsuma, all of Hachioji, Japan

[73] Assignee: Konica Corporation, Shinjuku, Japan

[ * ] Notice: The portion of the term of this patent subsequent to Jun. 1, 2093 has been disclaimed.

[21] Appl. No.: 650,856

[22] Filed: Feb. 5, 1991

[30] Foreign Application Priority Data

Feb. 5, 1990 [JP] Japan .................... 2-25784

[51] Int. Cl.⁵ .................................. G06K 9/60
[52] U.S. Cl. ................................ 382/61; 382/17; 358/453; 358/461
[58] Field of Search ............ 382/17, 61; 358/453, 358/461, 464

[56] References Cited

U.S. PATENT DOCUMENTS

| | | | |
|---|---|---|---|
| 4,538,182 | 8/1985 | Saito et al. | 382/61 |
| 4,937,662 | 7/1990 | Matsunawa et al. | 358/461 |
| 4,942,461 | 7/1990 | Abe et al. | 358/75 |
| 4,953,013 | 8/1990 | Tsuji et al. | 358/453 |

Primary Examiner—David K. Moore
Assistant Examiner—Barry S. Stellrecht
Attorney, Agent, or Firm—Finnegan, Henderson, Farabow, Garrett & Dunner

[57] ABSTRACT

A color image processing apparatus comprises an image reading circuit for reading an original image as three color-separated images, a color code generating circuit for generating a color code indicating whether each pixel of the original image is white, black, or chromatic, a color reproducing circuit for generating density data for each pixel corresponding to each of a plurality of recording colors based on the color-separated images, a marker area detecting circuit for detecting a marker on the original image based on the color code generated by the color code generating circuit and for extracting a marker area enclosed by the marker, a density data sampling circuit for sampling density data of pixels on the marker at a sampling point located at a selected distance, corresponding to a predetermined number of pixels, inside of the edge of the marker, and for determining a density data of the marker based on the sample density data, and a density data conversion circuit for converting the density data of pixels on a line within the marker area into the determined density data determined at first on the present line in the marker area.

5 Claims, 24 Drawing Sheets

MARKER MC

MARKER MC(R)

MARKER MC(B)

R

B

PHOTOGRAPHY MODE

CHARACTER MODE

FIG. 8

| COLOR CODE | | MARKER SIGNAL MC |
|---|---|---|
| 0 | 0 | 0 |
| (0 | 1 | 0) |
| 1 | 0 | 1 |
| 1 | 1 | 0 |

( ) MEANS "IMPOSSIBLE"

FIG. 9

| | SCANNER | | | PRINTER | | |
|---|---|---|---|---|---|---|
| | R | G | B | M/A C | M/A M | M/A Y |
| RED | 136 | 48 | 33 | 0 | 0.71 | 0.79 |
| GREEN | 30 | 61 | 52 | 0.71 | 0 | 1.07 |
| BLUE | 30 | 29 | 57 | 0.72 | 0.70 | 0 |
| CYAN | 32 | 84 | 147 | 0 | 0 | 0.87 |
| MAGENTA | 143 | 50 | 72 | 0 | 0.85 | 0 |
| YELLOW | 220 | 194 | 86 | 0.70 | 0 | 0 |
| BLACK | 24 | 24 | 24 | 0.70 | 0.75 | 0.81 |

FIG. 10

| M/A | 0 | 0.2 | 0.4 | 0.6 | 0.8 | 1.2 |
|---|---|---|---|---|---|---|
| Dr OF C | 0 | 0.331 | 0.548 | 0.790 | 0.969 | 1.165 |
| Dg OF M | 0 | 0.292 | 0.451 | 0.592 | 0.680 | 0.811 |
| Db OF Y | 0 | 0.217 | 0.320 | 0.410 | 0.456 | 0.530 |

| M/A | 0 | 0.16 | 0.3 | 0.5 | 0.8 | 1.3 |
|---|---|---|---|---|---|---|
| D OF BK | 0 | 0.2 | 0.4 | 0.6 | 0.8 | 1.0 |

FIG. 11

REGION I $a_{ij}(I)$ $\begin{pmatrix} 1.3623 & -0.4366 & -0.0655 \\ -0.4606 & 1.3121 & -0.2059 \\ 0.2127 & -1.1619 & 1.3989 \end{pmatrix}$ Red — Magenta REGION II $a_{ij}(II)$ $\begin{pmatrix} 1.4696 & -0.2312 & -0.3752 \\ -0.5047 & 1.2290 & -0.0786 \\ 0.1974 & -1.1908 & 1.4432 \end{pmatrix}$ Magenta — Blue REGION III $a_{ij}(III)$ $\begin{pmatrix} 0.9124 & 0.3043 & -0.3536 \\ -0.8283 & 1.6135 & -0.1395 \\ 0.3351 & -1.3515 & 1.4662 \end{pmatrix}$ Blue — Cyan REGION IV $a_{ij}(IV)$ $\begin{pmatrix} 1.1499 & -0.3408 & 0.0541 \\ -1.1530 & 2.4952 & -0.6965 \\ 0.3942 & -1.5119 & 1.5675 \end{pmatrix}$ Cyan — Green REGION V $a_{ij}(V)$ $\begin{pmatrix} 1.1860 & -0.2164 & -0.1066 \\ -1.2187 & 2.2694 & -0.4052 \\ 0.4650 & -1.2687 & 1.2532 \end{pmatrix}$ Green — Yellow REGION VI $a_{ij}(VI)$ $\begin{pmatrix} 1.3571 & -0.4139 & -0.0801 \\ -0.4916 & 1.4298 & -0.2926 \\ 0.1428 & -0.8965 & 1.2034 \end{pmatrix}$ Yellow — Red $L^* a^* b^*$ EQUI-COLOR COORDINATE SYSTEM

■ : ORIGINAL
○ : COPY

π: BOUNDARY PLANE BETWEEN REGIONS I AND II

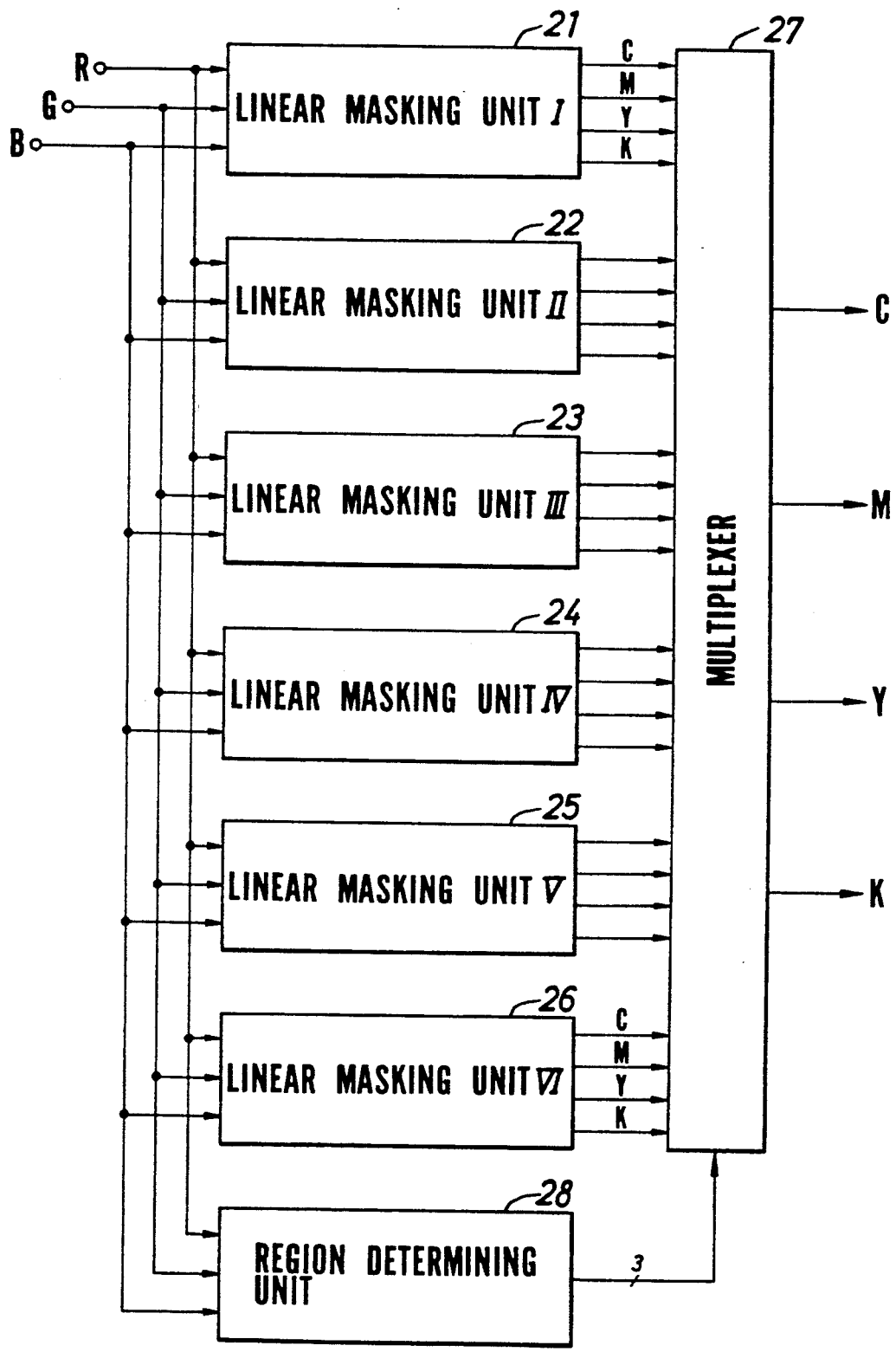

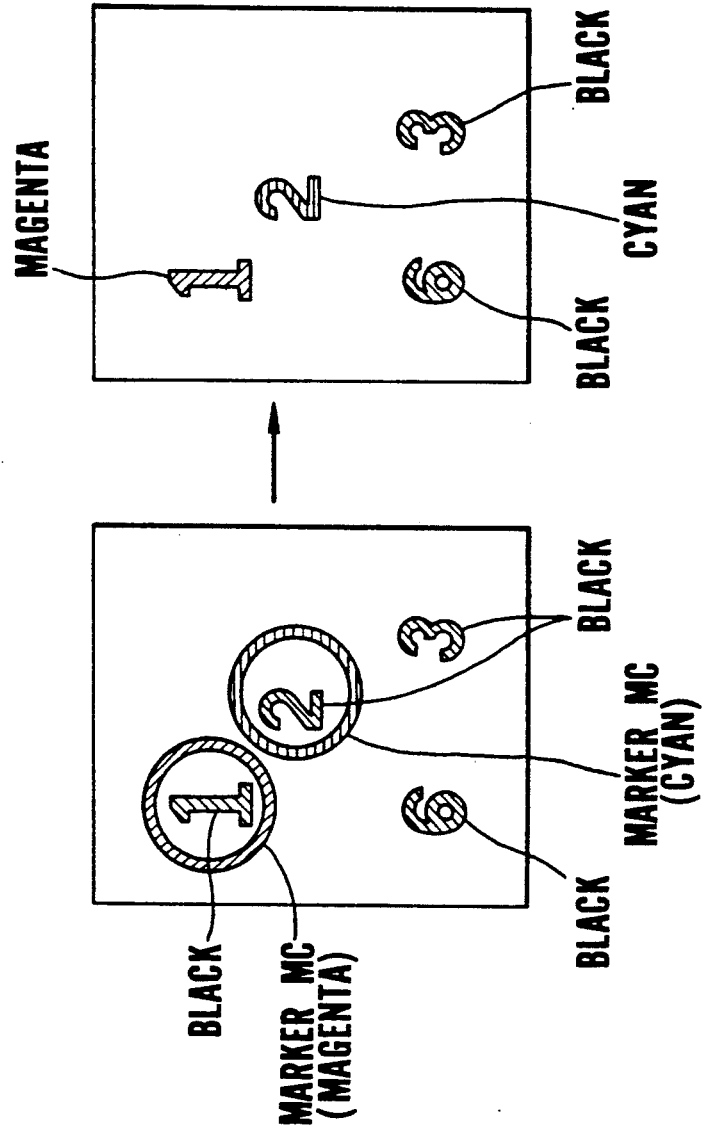

FIG. 22

| COLOR CODE<br>SCANNER CODE | MARKER REGION | WHITE<br>0 0 | CHROMATIC COLOR<br>1 0 | BLACK 1 1 | |
|---|---|---|---|---|---|
| | | | | IN REGION<br>1 | OUT REGION<br>0 |
| Y | | 0 | 0 | D | 0 |
| M | | 0 | 0 | D | 0 |
| C | | 0 | 0 | D | 0 |
| K | | 0 | 0 | 0 | D |

| MARKER AREA / SCANNER CODE | IN REGION | OUT REGION | REVERSE/HALFTONE PROCESSING MODE |
|---|---|---|---|
| Y | 1 | 0 | 0 |
| M | Dv/Do | 0 | 0 |
| C | Dv/Do | 0 | 0 |
| K | Dv/Do | 0 | 0 |
| | 0 | D | D |

Q : AREA SIGNAL
MS: MARKER SIGNAL

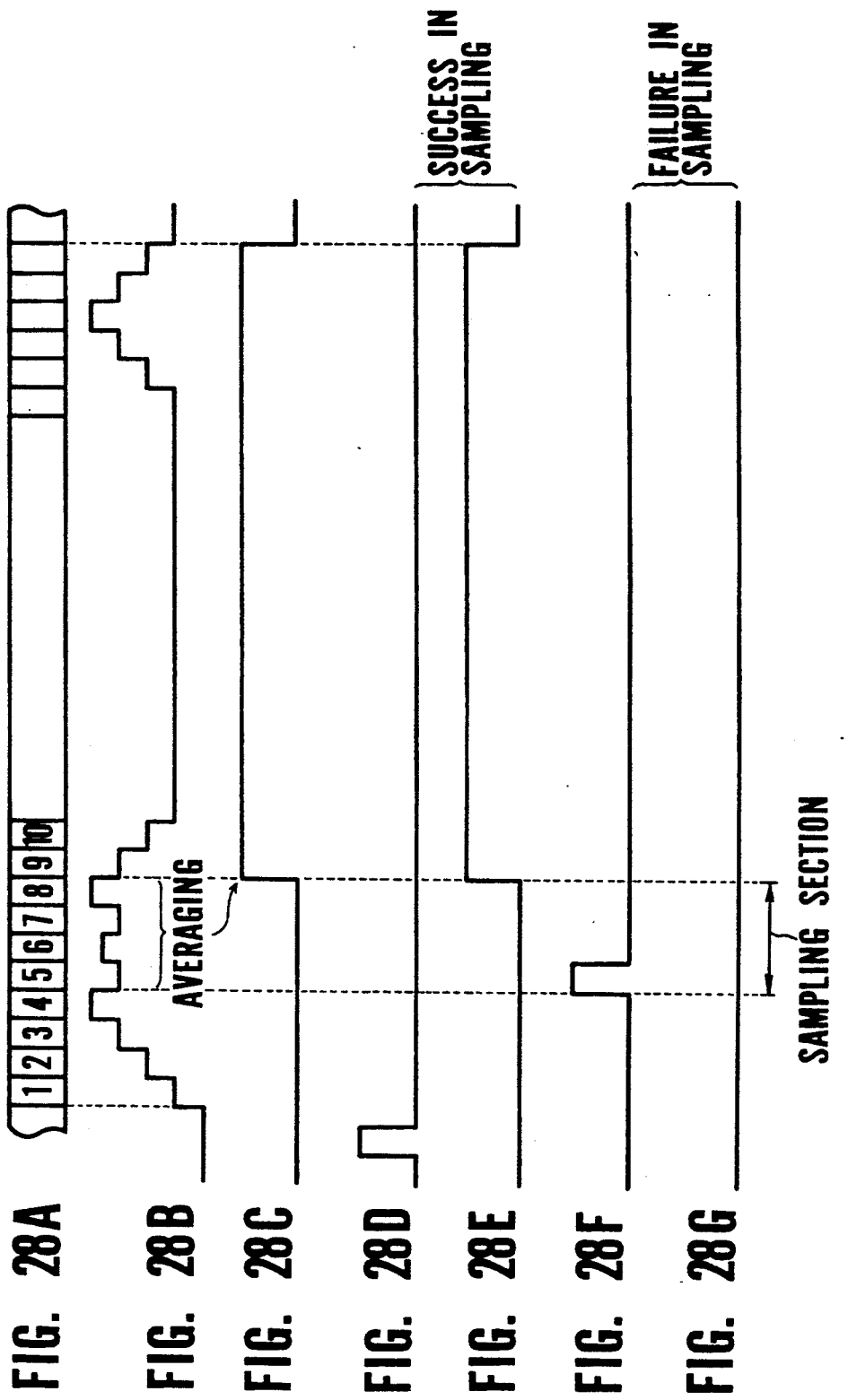

MARKER COLOR CONVERSION APPARATUS FOR COLOR IMAGE PROCESSING DEVICE

BACKGROUND OF THE INVENTION

1. Field of the Invention

The present invention relates to a color image processing apparatus for use in a full color copying system, and more particularly to such a color image processing apparatus which includes a means for preventing the quality of a marker-enclosed image from being degraded by density irregularities of a marker that has been written on an original to be copied.

2. Description of the Prior Art

There has been known a color image processing apparatus for optically reading a color image, such as an image containing letters, a photographic image, or the like, as red (R), green (G), and blue (B) signals, converting these signals into recording colors comprising yellow (Y), magenta (M), cyan (C), and black (K), and recording a reproduced color image on a recording sheet based on the recording colors using an output hardcopy device such as an electrophotographic color copying machine.

One type of such color image processing apparatus has a marker color conversion circuit for converting the color of a black character or characters which are enclosed by a marker or markers on an original into the color or colors of the marker or markers.

As shown in FIG. 1 of the accompanying drawings, the marker color conversion circuit reads the area enclosed by the marker MC and the color of the marker, and determines the area and the marker color with respect to each scanning line. The marker color is determined at sampling points, each indicated by a dot ".", on the scanning lines.

Some marker color conversion circuits are designed to determine the recording density of an image enclosed by a marker MC depending on the density of the marker MC. If, however, the density of the marker MC has irregularities, those density irregularities appear directly as irregularities of the recording density of the image, resulting in a poor recording image quality.

When an image area is enclosed by an upper red marker MC(R) and a lower blue marker MC(B) as shown in FIG. 2, the image in the marked area which is recorded contains an upper image segment which is red and a lower image segment which is blue, so far as determination of marker color in terms of mere line unit is concerned. It would be better, from the standpoint of clear visual perception, if the image in its entirety were recorded in the same color as the first marker MC used.

SUMMARY OF THE INVENTION

In view of the foregoing drawbacks of the conventional color image processing apparatus with the marker color convension capability, it is an object f the present invention to provide a color image processing apparatus which prevents a marked image from being recorded in degraded quality due to marker density irregularities and also prevents a marked image from being recorded in a plurality of colors.

To achieve the above object, there is provided a color image processing apparatus comprising image reading means for reading an image on an original as three color-separated images, color code generating means for generating a color code indicating whether each pixel of the color-separated images read by the image reading means is white, achromatic, or chromatic, color reproducing means for converting each of the color-separated images into density data depending on the recording color thereof, marker area detecting means for detecting a marker on the image on the original based on the color codes generated by the color code generating means, and extracting a marker area enclosed by the marker, and marker color converting means for propagating density data determined at a point sampled on a scanning line in the marker area, pixel by pixel in a main scanning direction and propagating density data determined on a preceding scanning line in an sub scanning direction, whereby the density data at the sampled point and the color of the marker at the sampled point are regarded as the density data and the color of the marker throughout the marker area.

With the above arrangement, a certain point on a certain scanning line in a marker area is sampled to detect the density data and marker color at the point. The density data and marker color which are thus detected are propagated throughout the marker area, and employed as the density data and marker color of the marker.

The image in the marker area which is enclosed by the marker therefore has a density corresponding to the density data, and the recording color is the same as the marker color at the sampled point.

To equalize the density data determined at the point sampled on the scanning line in the marker area and the marker color at the sampled point, to the density data and the marker color throughout the marker area, the determined density data are propagated pixel by pixel in the main scanning direction, and the density data determined on a preceding scanning line (e.g., the density data determined at first) are propagated in an sub scanning direction, as shown in FIG. 3.

When an area is marked by markers in two colors, as shown in FIG. 2, the color of image information in the closed area or loop is converted into the color which has been determined at first.

Even when a specially shaped area is marked with markers in two colors as shown in FIG. 4, the color of the image information in the marked area is converted somewhat neatly as shown.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 8 is a table of color codes;

FIGS. 9, 10, 11, and 14 are diagrams showing masking coefficients;

FIG. 18 is a block diagram of a linear masking circuit;

FIGS. 20A and 20B are diagrams of a marker color conversion process;

FIGS. 22 and 23 are diagrams showing the manner in which the marker color conversion circuit operates;

FIG. 24 is a block diagram of an area detector;

FIGS. 27A, 27B and 28A through 28G are diagrams showing a marker area signal;

DETAILED DESCRIPTION OF THE PREFERRED EMBODIMENT

Figure 5:
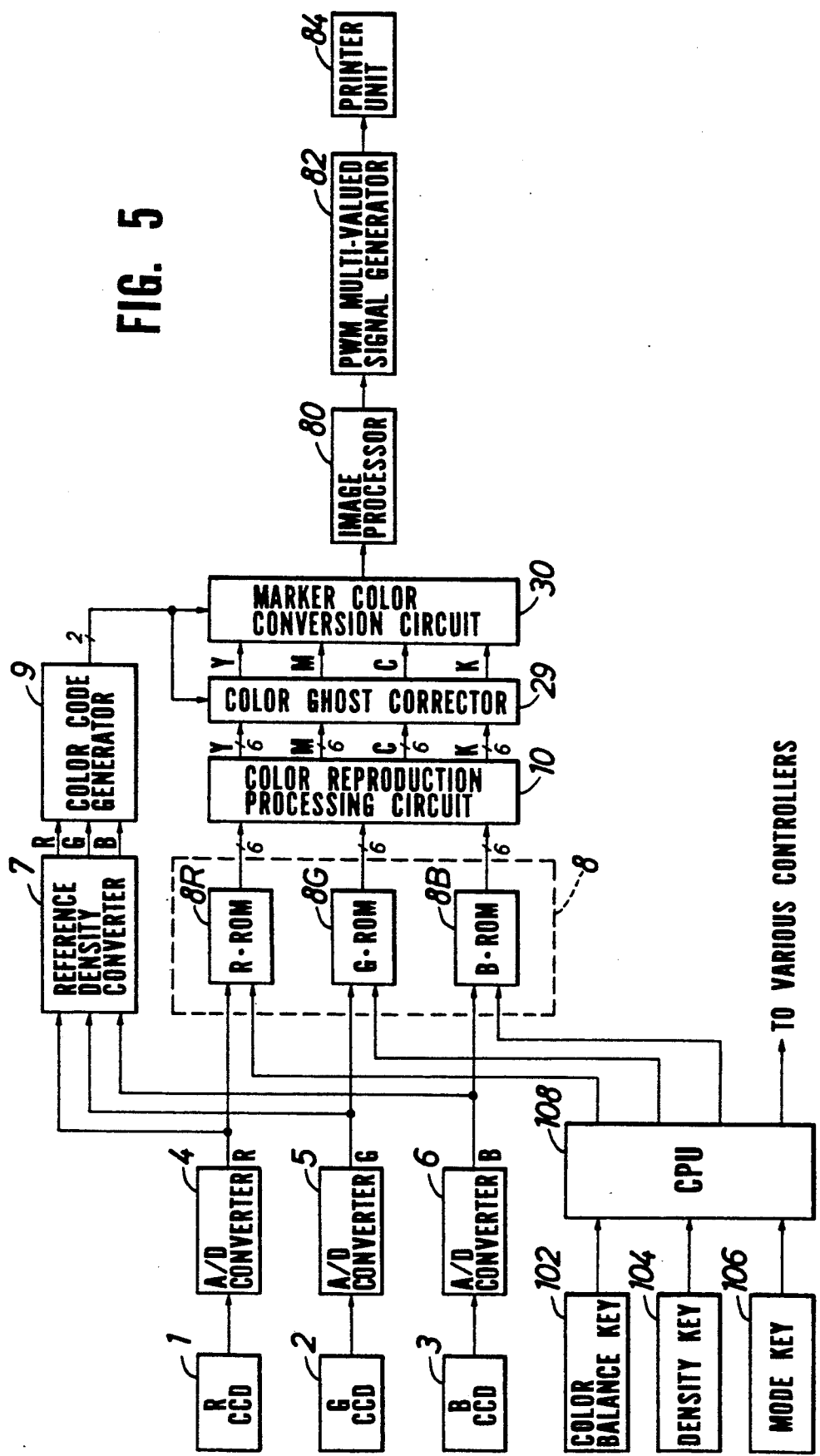
FIG. 5 is a block diagram of a color image processing apparatus according to the present invention.

As shown in FIG. 5, a color image processing apparatus according to the present invention includes an R-CCD (Charge-Coupled Device) 1 for converting a red original image into an image signal, a G-CCD 2 for converting a green original image into an image signal, and a B-CCD 3 for converting a blue original image into an image signal.

Image information (optical image) contained in an original to be recorded or copied is first separated into color-separated images representing color information R, G, B, and these color-separated are focused on the respective R-CCD 1, G-CCD 2, and B-CCD 3.

The color image processing apparatus has an A/D converter 4 for converting the red image signal read by the R-CCD 1 into 8-bit digital data, an A/D converter 5 for converting the green image signal read by the G-CCD 2 into 8-bit digital data, and an A/D converter 6 for converting the blue image signal read by the B-CCD 3 into 8-bit digital data.

When the image signals are converted into the corresponding 8-bit digital data by these A/D converters 4, 5, 6, the shading of the color-separated images is also corrected on the basis of image data from a reference white plate.

Red, green, and blue digital image signals from the A/D converters 4, 5, 6 are converted into respective 6-bit digital data by a reference density converter 7. The reference density converter 7 supplies 6-bit digital image signals to a color code generator 9 which generates color codes. The reference density converter 7 is used only to generate color codes.

The color codes are 2-bit codes for indicating whether each pixel is white, black, or chromatic. For example, the color code for white pixels is "00", the color code for black pixels is "11", and the color code for chromatic pixels is "10".

The R, G, B digital image signals from the A/D converters 4, 5, 6 are also supplied to a variable density converter 8 whose output values can be adjusted by the operator. The variable density converter 8 will be described in detail later on.

The color image processing apparatus also includes a color balance key 102 for effecting color balancing, a density key 104 for adjusting the color density, and a mode key 106 for selecting either a photography mode or a character mode (or other modes). Input signals from these keys 102, 104, 106 are applied to a CPU 108 serving as a controller.

The CPU 108 generates reference addresses based on the supplied input signals. The generated reference addresses are sent to the variable density converter 8, which refers to data stored in the variable density converter 8 based on the reference addresses and produces R, G, B 6-bit density signals.

Depending on the R, G, B 6-bit density signals produced by the variable density converter 8, a color reproduction processing circuit 10 reproduces colors, i.e., yellow Y, magenta M, cyan C, and black K from the colors red R, green G, and blue B, and produces Y, M, C, K 6-bit density signals.

The Y, M, C, K 6-bit density signals are supplied to a color ghost corrector 29 for removing color ghosts from around reproduced black letters. The color ghost corrector 29 detects whether a color ghost is produced in a pixel, using a 1×7 window, and converts the color code of the pixel in which a color ghost has been detected, into a correct color code. Such color ghost correction is carried out in both main and auxiliary scanning directions.

For further details of the color ghost corrector 29, reference should be made to Japanese Laid-Open Patent Publication No. 1(1989)-195775, for example.

A marker color conversion circuit 30 detects a marker area, i.e., an area enclosed by a marker, on the original, and converts the color of the marker-enclosed area into the color of the marker. The marker color conversion circuit 30 produces a 6-bit marker color density signal D and a marker area signal Q.

The marker color density signal from the marker color conversion circuit 30 is processed for various forms of image processing such as filtering, magnifying, halftoning, etc. by an image processor 80. The 6-bit marker color density signal from the image processor 80 is converted into a multi-valued signal by a PWM multi-valued signal generator 82 based on pulse-width modulation (PWM). A printer unit 84 produces a color image by successively superposing Y, M, C, K toner images on a photosensitive drum (OPC).

The components of the color image processing apparatus will hereinafter be described in greater detail.

First, the overall arrangement and operation of a color copying machine incorporating the color image processing apparatus shown in FIG. 5 will be described with reference to FIG. 6.

It is assumed that the color copying machine employs the dry-type image development process for effecting two-component non-contact and reversed image development. The color copying machine includes no image transfer drum for color image formation, but has a photographic photosensitive drum for carrying superposed color-separated images to produce a color image.

Moreover, the color copying machine in the illustrated embodiment is of a relatively small size and operates in such a manner that the four color-separated images, i.e., Y, M, C, K images are developed successively on the photosensitive drum while the drum makes four revolutions, and then transferred at once onto a sheet of recording paper such as plain paper.

A copy start button (not shown) on a control panel of the color copying machine is pressed to energize an original reader A. An original 101 carrying a color image to be copied, is placed on an original support panel 128, and is optically scanned by an optical system.

The optical system comprises a carriage 132 supporting a light source 129 such as a halogen lamp and a reflecting mirror 131, and a movable mirror unit 134 including mirrors 133, 133' positioned in a V configuration.

The carriage 132 and the movable mirror unit 134 are moved on slide rails 136 at a predetermined speed in a predetermined direction by a stepping motor (not shown).

The light source 129 applies light to the original 101, and reflected light from the original 101, which contain optical image information of the original 101, is reflected by the mirrors 131, 133, 133' into an optical information conversion unit 137.

Figure 6:
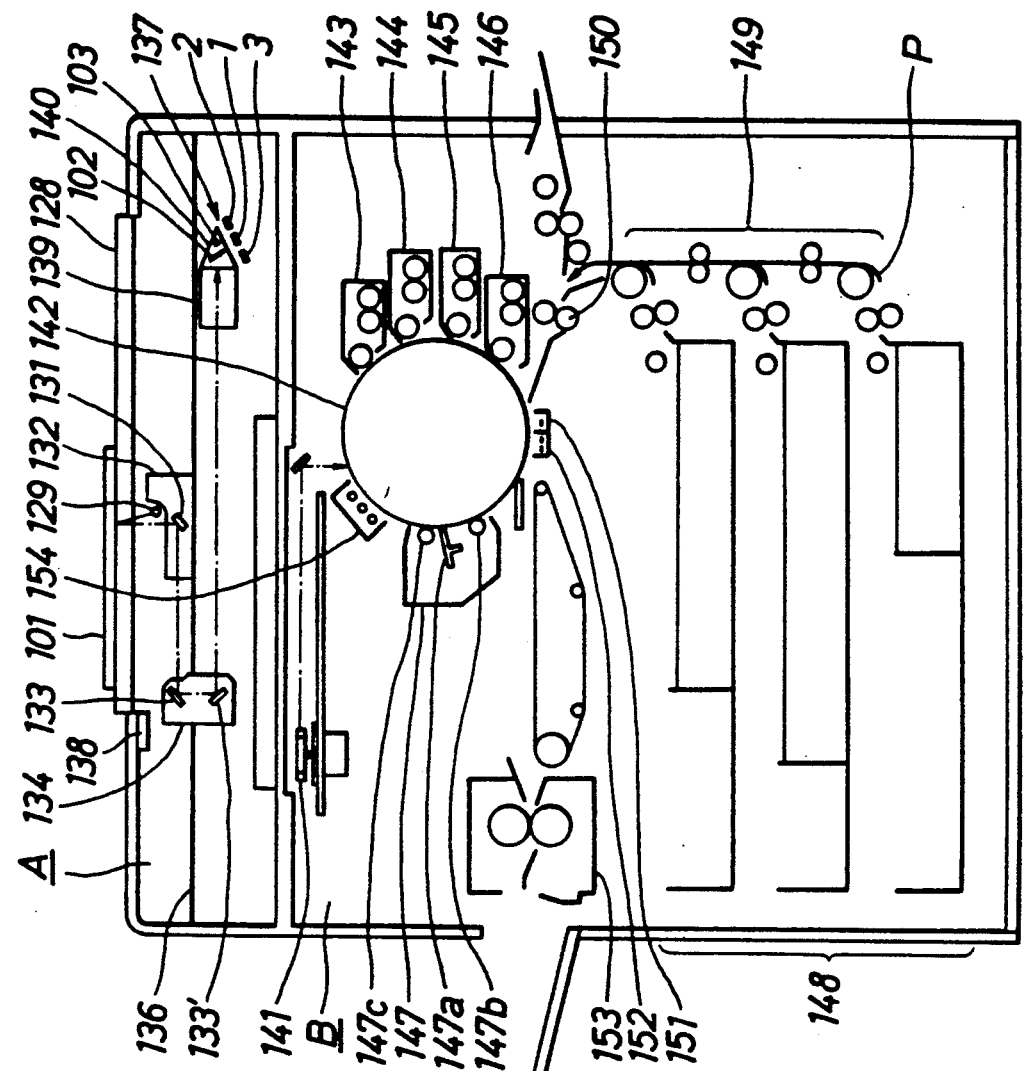
FIG. 6 is a schematic elevational view showing an overall structure of a color copying machine incorporating the color image processing apparatus.

A reference white plate 138 is attached to the lower surface of the original support panel 128 at its left end (as viewed in FIG. 6). At the same time that the original 101 is optically scanned, the reference white plate 138 is also optically scanned to produce a reference white signal against which the image signals will be normalized.

The optical information conversion unit 137 includes a lens 139, a prism 140, and a pair of dichroic mirrors 102, 103. The optical information conversion unit 137 also includes the R-CCD 1 for generating a red color-separated image signal, the G-CCD 2 for generating a green color-separated image signal, and the B-CCD 3 for generating a blue color-separated image signal.

The light signal transmitted from the optical system is converged by the lens 139, and is separated into blue optical information and yellow optical information by the dichroic mirror 102 in the prism 140. The yellow optical information is then separated into red optical information and green optical information by the dichroic mirror 103 in the prism 140. In this manner, the color optical image produced from the original 101 by the optical system is separated into three-color optical information, i.e., R, G, B optical information.

The color-separated optical images are then focused on the photosensitive surfaces of the respective R-CCD 1, G-CCD 2, and B-CCD 3, which produce corresponding electric image signals. These image signals are then processed by a signal processing system, which includes the color image processing apparatus shown in FIG. 5. Processed image signals are then supplied to a recording system B, which corresponds to the printer unit 84 shown in FIG. 5. The recording system B includes a light deflector 141. The light deflector 141 may comprise a galvanometric mirror, a rotating polygon, or a quartz light deflector.

A laser beam which is modulated by the image signals supplied from the signal processing system is periodically deflected by the light deflector 141 to scan an image forming body or photosensitive drum 142.

More specifically, when the laser beam starts being deflected by the light deflector 141, the laser beam as it is deflected is detected by a laser beam index sensor (not shown) which generates a signal to start modulating the laser beam with a first color signal, e.g., a yellow signal. The modulated laser beam then scans the photosensitive drum 142 which has been uniformly charged by an electric charger 152, while the photosensitive drum 142 is rotating.

The photosensitive drum 142 is scanned in a main scanning direction along its own axis by the modulated laser beam, and also scanned in a sub scanning direction normal to the main scanning direction by the continuous rotation thereof. As the photosensitive drum 142 is thus scanned in the main and sub scanning directions, it produces thereon an electrostatic latent image corresponding to the first color image.

The electrostatic latent image on the photosensitive drum 142 is then developed into a yellow toner image by an image developing unit 143 which contains yellow toner. During operation, a predetermined development bias voltage is applied to the image developing unit 143 by a high-voltage power supply.

The image developing unit 143 is supplemented with toner, when required, by a toner supply unit (not shown) based on a command signal from a system control CPU (not shown).

The yellow toner image is continuously carried on the photosensitive drum 142 with a cleaning blade 147a lifted off the photosensitive drum 142. Thereafter an electrostatic latent image is produced on the photosensitive drum 142 in superposed relation to the yellow toner image based on a second color image, e.g., a magenta signal. The electrostatic latent image which has newly been produced is then developed into a magenta toner image by an image developing unit 144 containing magenta toner. A predetermined development bias voltage is also applied to the image developing unit 144 by the high-voltage power supply.

Likewise, an electrostatic latent image is produced on the photosensitive drum 142 in superposed relation to the toner images produced so far, based on a third color signal, e.g., a cyan signal, and is subsequently developed into a cyan toner image by an image developing unit 145 containing cyan toner. Finally, an electrostatic latent image is produced on the photosensitive drum 142 in superposed relation to the toner images produced so far, based on a fourth color image, e.g., a black signal, and is subsequently developed into a black toner image by an image developing unit 145 containing black toner.

Therefore, the multi-color toner image is generated on the photosensitive drum 142.

While the multi-color toner image is composed of four colors in the illustrated embodiment, a toner image composed of two colors or a single color may also be generated on the photosensitive drum 142.

In the illustrated embodiment, the electrostatic latent images are developed into toner images according to the two-component non-contact jumping development process in which under AC and DC bias voltages applied from the high-voltage power supply, the toners are forced to fly from the image developing units 143, 144, 145, 146 toward the photosensitive drum 142 to develop the electrostatic latent images.

The image developing units 144, 145, 146 are also supplemented with toner, when required, based on a command signal from the system control CPU.

A sheet P of recording paper is supplied from a sheet supply unit 148 by feed rolls 149 and timing rolls 150, and fed onto the photosensitive drum 142 in timed relation to the rotation of the photosensitive drum 142. The multi-color toner image on the photosensitive drum 142 is transferred onto the sheet P by a transfer electrode 141 to which a high voltage is being applied by the high-voltage power supply, and then the sheet P is separated from the photosensitive drum 142 by a separator electrode 152 to which a high voltage is also being applied by the high-voltage power supply.

The sheet P separated from the photosensitive drum 142 is then fed into a fixing unit 153 in which the multi-color toner image is fixed to the sheet P.

After the multi-color toner image has been transferred from the photosensitive drum 142, the photosensitive drum 142 is cleaned by a cleaning unit 147, and readied for a next image producing cycle.

In the cleaning unit 147, a predetermined DC voltage is applied to a metal roll 147b which is held out of contact with the photosensitive drum 142, in order to allow the toner scraped off the photosensitive drum 142 by the cleaning blade 147a to be collected easily. While the toner is being removed from the photosensitive drum 142, the cleaning blade 147a is kept in contact with the photosensitive drum 142. After the toner has been removed, the cleaning blade 147a is lifted off the photosensitive drum 142. The cleaning unit 147 also has an auxiliary roll 147a for removing any remaining toner from the photosensitive drum 142 after the cleaning blade 147a has been lifted off. The auxiliary roll 147c rotates in the direction opposite to the direction in which the photosensitive drum 142 rotates, and is pressed against the photosensitive drum 142, for removing any remaining toner therefrom.

Figure 7A:
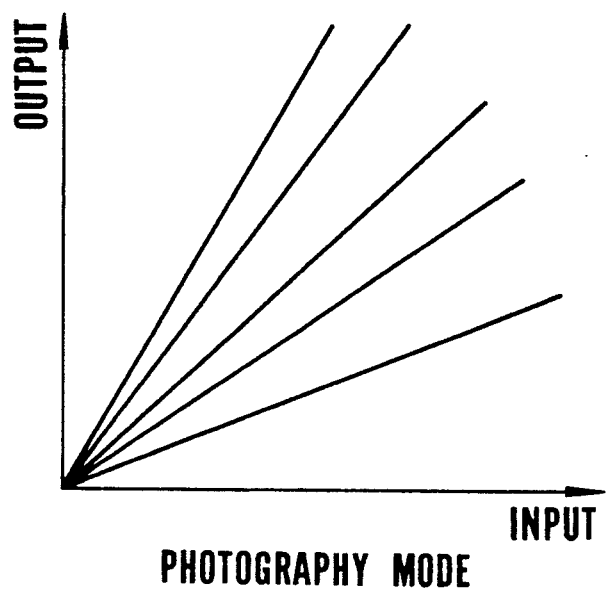
FIGS. 7A and 7B are graphs showing the characteristics of variable densities.

As shown in FIG. 5, the variable density converter 8 comprises ROMs 8R, 8G, 8B which store density data with respect to the R, G, B digital image signals from the A/D converters 4, 5, 6, respectively. Each of the ROMs 8R, 8G, 8B store density data as shown in FIGS. 7A and 7B.

Figure 7B:
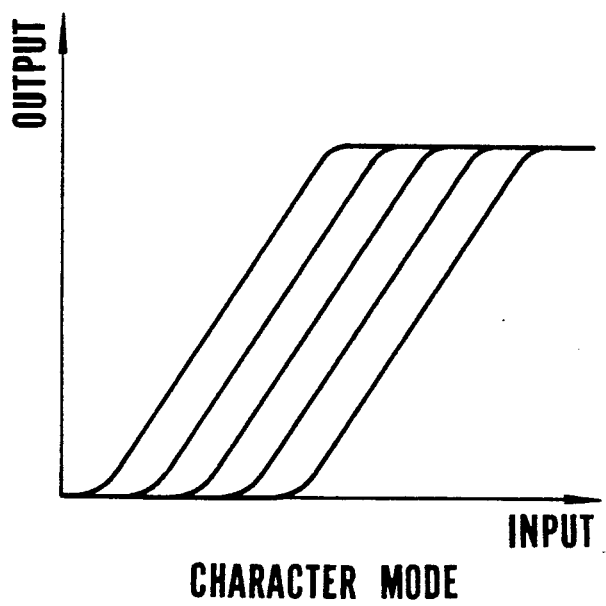

FIG. 7B shows density data to be used in the photography mode selected by the mode key 106. FIG. 7B shows density data to be used in the character mode selected by the mode key 106.

Either the photography mode or the character mode is selected by the mode key 106 to select the corresponding density data in the ROMs 8R, 8G, 8B, In the ROMs 8R, 8G, 8B, appropriate density curves and density data are referred to depending on the color balancing indicated by the color balance key 102 and the density indicated by the density key 104.

As described above, the color code generator 9 generates 2-bit color codes, and the color reproduction processing circuit 10 generate Y, M, C, K 6-bit density signals. Depending on the levels of the data of the R, G, B digital image signals from the reference density converter 7, the color code generator 9 generates color codes each indicating whether a pixel is a white, black, or chromatic region. FIG. 8 shows such color codes, "00" for white pixels, "11" for black pixels, and "10" for chromatic pixels. Processes of generating color codes will be described below.

1. Generation of a White Color Code

The R, G, B densities are converted into values in an XYZ coordinate system according to the following equation:

$$\begin{pmatrix} X \\ Y \\ Z \end{pmatrix} = \begin{pmatrix} 0.6580 & 0.0838 & 0.1812 \\ 0.3279 & 0.6158 & -0.0027 \\ -0.0087 & -0.3369 & 1.4888 \end{pmatrix} \cdot \begin{pmatrix} R \\ G \\ B \end{pmatrix} \quad (1)$$

The values in the XYZ coordinate system are then converted into values in a uniform perceptual color space L*a*b* according to the following equations:

$$L^* = 116(Y/Y_o)^{\frac{1}{3}} - 16 \quad (2)$$

$$a^* = 500[(X/X_o)^{\frac{1}{3}} - (Y/Y_o)^{\frac{1}{3}}] \quad (3)$$

$$b^* = 200[(X/X_o)^{\frac{1}{3}} - (Z/Z_o)^{\frac{1}{3}}] \quad (4)$$

where
Yo = 100,
Xo = 98.07, and
Zo = 118.28.

Pixels in the region where $L^* \geq 90$ in the uniform perceptual color space L*a*b* are regarded as pixels in the white region, and a white color code is given to those pixels.

2. Generation of an Achromatic (Black) Code

A parameter QK is determined from the R, G, B densities according to the following equation:

$$QK = \sqrt{\{(R - W_o)^2 + (G - W_o)^2 + (B - W_o)^2\}/(W \cdot W_o)} \quad (5)$$

Pixels in the region where $QK \leq 15$ are regarded as pixels in the black region, and a black code is given to those pixels.

3. Generation of a Chromatic (Black) Code

Any region which is not either the white region or the black region is regarded as a chromatic region, and a chromatic code is generated for pixels in such a chromatic region.

The color reproduction processing circuit 10 converts the R, G, B 6-bit density signals into Y, M, C, K 6-bit density signals. Since the spectral sensitivity of the optical system or scanner for scanning the original and the spectral reflectivity of the toners are different from each other, the R, G, B density levels determined on the basis of the scanner level are converted into C, M, Y toner density levels according to the linear masking method (see the equation (1)).

Figure 13:
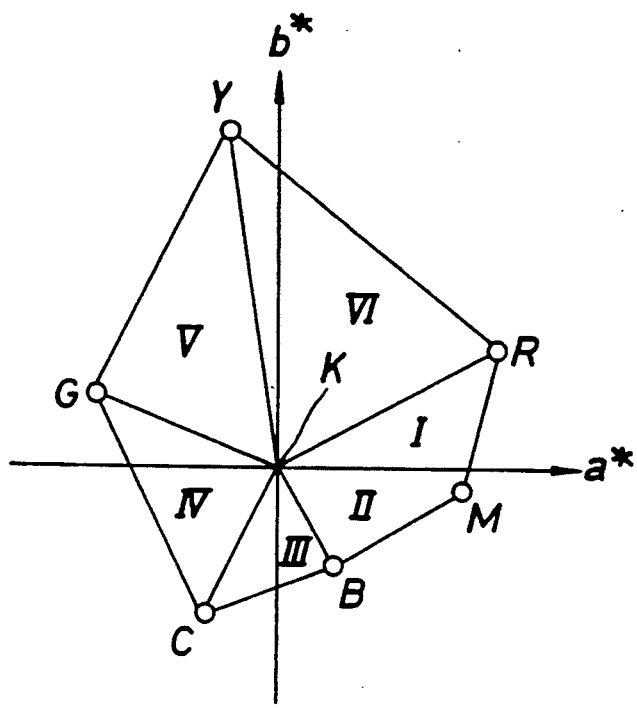
FIG. 13 is a diagram showing the relationship between the L*a*b* coordinate system and divided regions.

According to the present invention, masking coefficients are calculated as follows:

Using the seven sample colors R, G, B, C, M, Y, K, the color space is divided into six regions as shown in FIG. 13, which illustrates an L*a*b* uniform perceptual color space coordinate system.

Then, using the colors (three colors) at the vertexes of the divided regions, masking coefficients aij for use in those regions are calculated according to the above equation. For example, since the region I is composed of the colors R, K, M, the masking coefficient aij(I) are calculated using these colors. Examples of calculations are given below.

The luminance levels of the R, G, B image signals which are produced by the scanner are converted into corresponding density levels according to the following equations:

$$Dr = -(64/1.5)log_{10}\{(R+0.5)/256\} \quad (6)$$

$$Dg = -(64/1.5)log_{10}\{(G+0.5)/256\} \quad (7)$$

$$Dh = -(64/1.5)log_{10}\{(B+0.5)/256\} \quad (8)$$

With respect to the C, M, Y image signals, the luminance levels are converted into corresponding density levels using monochromatic density vs. toner deposit curves (not shown).

FIG. 9 shows R, G, B scanner levels or luminance levels used when calculating masking coefficients using the seven colors R, G, B, C, M, Y, K and measured amounts (M/A) of deposited C, M, Y toners.

In order to express the colors in the left column, the illustrated luminance levels are produced by the scanner for the colors R, G, B, and the illustrated amounts (M/A) of toners are deposited by the printer unit for the colors C, M, Y.

FIG. 10 shows the relationship between the amounts M/A of deposited toners and the density levels Dr, Dg, Db.

Based on the tables shown in FIGS. 9 and 10 and the equations (6) through (8), masking coefficients aij(I) through aij(VI) are calculated so that the R, G, B densities are equalized to the C, M, Y densities. FIG. 11 shows, by way of example, masking coefficients thus calculated for the regions I through VI.

Figure 12:
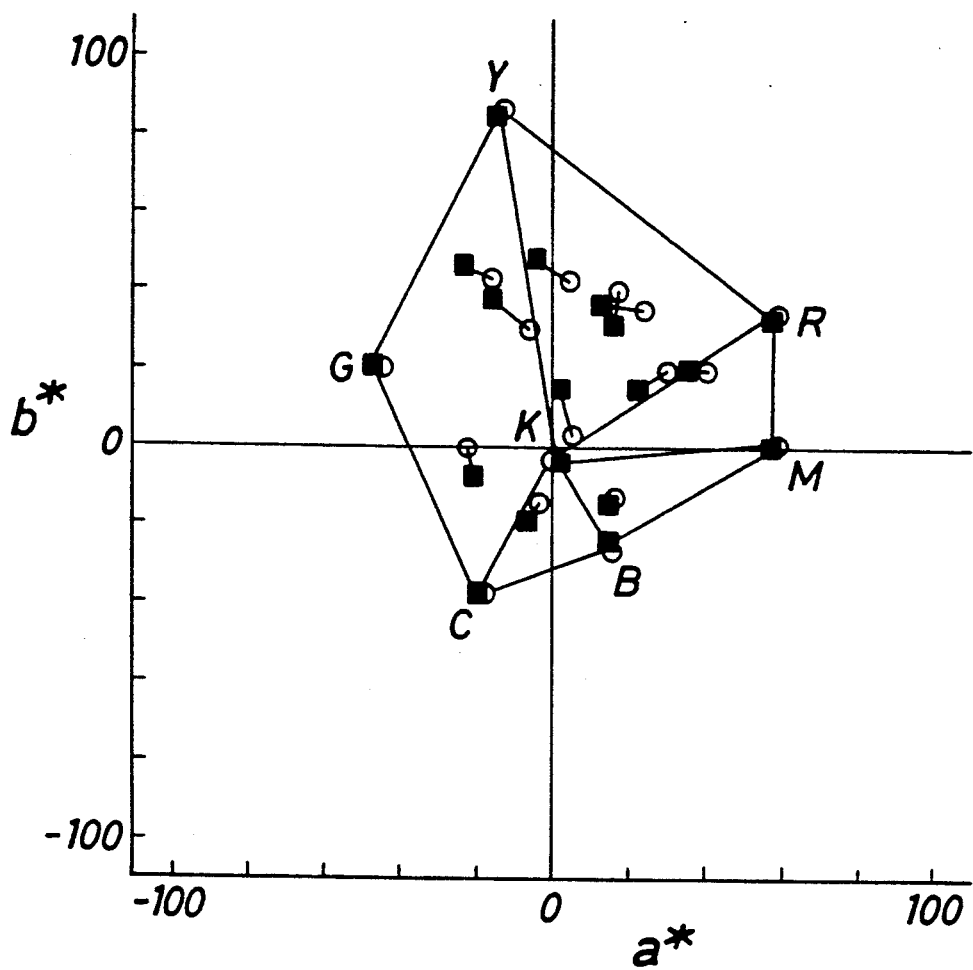
FIG. 12 is a diagram of an $L^*a^*b^*$ coordinate system.

According to the above process, at least the seven colors R, G, B, Y, M, C, K remain completely the same after the conversion. Any conversion error which may occur with respect to the colors in the divided regions is insignificant since the divided regions are of small area. When masking coefficients are calculated using the divided regions, any conversion errors are minimized as shown in FIG. 12, resulting in an increase in the color reproducibility.

The calculation of masking coefficients using the divided regions gives rise to possible discontinuities of converted colors at the boundaries between the regions. Such possible color discontinuities will be analyzed below.

The boundary between the regions I, II will be described below. However, the following description also applies to the other boundaries between the regions.

First, equations for the plane of the boundary are determined, and substituted in linear masking matrixes of the regions I, II. If these linear masking matrixes are equal to each other, then all the values on the boundary plane are equal to each other, so that the converted colors prove to be continuous across the boundary plane.

Figure 14:
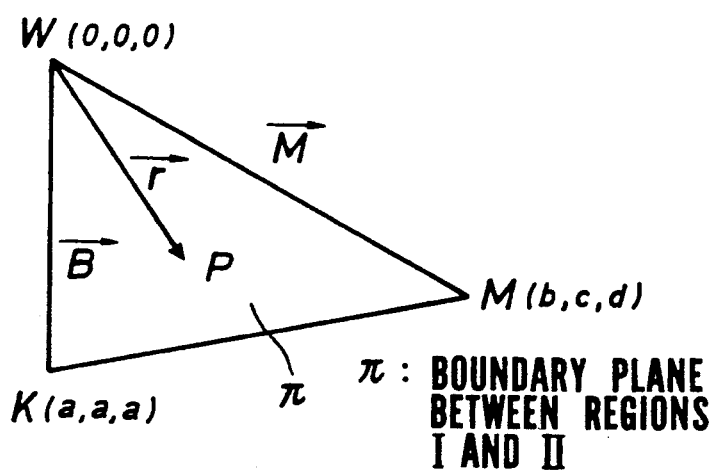

As shown in FIGS. 13 and 14, the boundary plane $\pi$ between the regions I, II passes through three points white (W), M, K. The vector r from the origin toward any point p on the plane $\pi$ is expressed by:

$$r = \alpha B + \beta M \quad (9a)$$

where $\alpha, \beta$ are any real numbers. The magnitude (density level) of the vector is given as:

$$(Dr, Dg, Db) = \alpha(a, a, a) + \beta(b, c, d) \quad (9b)$$

Substituting the values shown in FIGS. 9 through 11 for a, b, c, d, the following equations are given:

$$Dr = 1.028\alpha + 0.253\beta$$

$$Dg = 1.028\alpha + 0.709\beta \quad (10)$$

$$Dr = 1.028\alpha + 0.5513\beta$$

Putting these equations in the masking matrix of the region I, the following equation is given:

$$\begin{pmatrix} C \\ M \\ Y \end{pmatrix} = \begin{pmatrix} 1.3623 & -0.4336 & -0.0655 & 1.028\alpha + 0.253\beta \\ -0.4606 & 1.3121 & -0.2059 & 1.028\alpha + 0.709\beta \\ 0.2127 & -1.1619 & 1.3989 & 1.028\alpha + 0.551\beta \end{pmatrix}$$

$$= \begin{pmatrix} 0.889 & 0.001 \\ 1.665 & 0.700 \\ 0.463 & 0.001 \end{pmatrix} \begin{pmatrix} \alpha \\ \beta \end{pmatrix}. \quad (11)$$

Putting the above equations also in the masking matrix of the region II, the following equation is given:

$$\begin{pmatrix} C \\ M \\ Y \end{pmatrix} = \begin{pmatrix} 1.4696 & -0.2312 & -0.3752 & 1.028\alpha + 0.253\beta \\ -0.5047 & 1.2290 & -0.0789 & 1.028\alpha + 0.709\beta \\ -0.1974 & -1.1908 & 1.4432 & 1.028\alpha + 0.551\beta \end{pmatrix}$$

$$= \begin{pmatrix} 0.889 & 0.001 \\ 1.665 & 0.700 \\ 0.463 & 0.001 \end{pmatrix} \begin{pmatrix} \alpha \\ \beta \end{pmatrix}. \quad (12)$$

Consequently, the values on the boundary plane calculated using the masking coefficient aij(I) for the region I and the masking coefficient aij(II) for the region II are exactly the same. Thus, no discontinuity of the converted colors is developed across the boundary plane.

Figure 15:
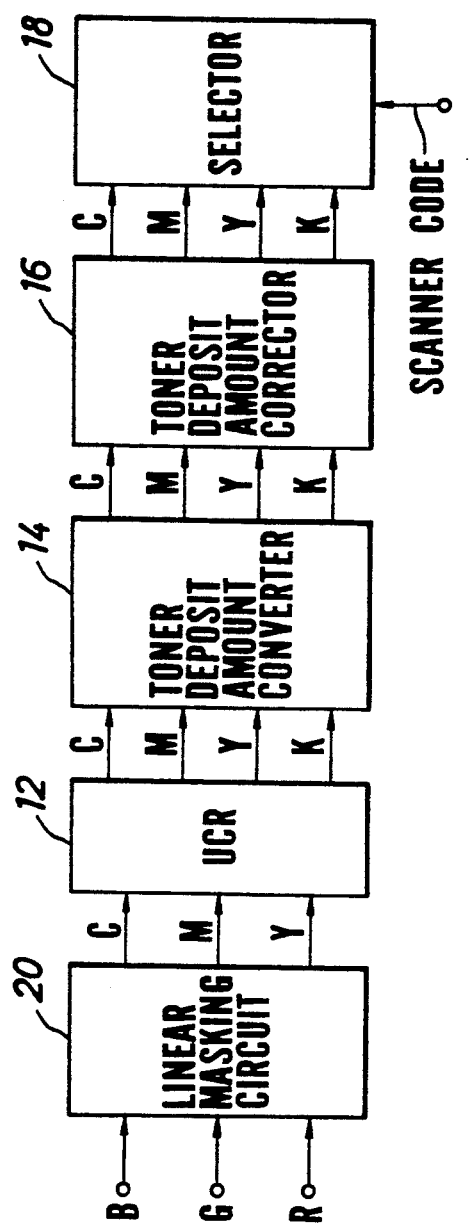
FIG. 15 is a block diagram of a color reproduction processing circuit.

FIG. 15 shows the color reproduction processing circuit 10 in greater detail.

The R, G, B signals (luminance levels) are processed in the manner described above and converted into C, M, Y signals by a linear masking circuit 20. The converted C, M, Y signals are then supplied to an undercolor remover (UCR) 12 which replaces the black component (undercolor) with a black toner density K.

The undercolor remover 12 operates as follows:

First, equivalent achromatic densities C', M', Y' of the C, M, Y signals are determined according to the equations:

$$C' = \alpha C$$

$$M' = \beta M \quad (13)$$

$$Y' = \gamma Y$$

These equations indicate that if the cyan density is C, for example, then the density of the black produced by adding suitable amounts of magenta M and yellow Y to cyan is C'. This also holds true for the magenta and yellow densities M', Y'.

The above coefficients $\alpha, \beta, \gamma$ are determined according to the following equation, selecting one of the six masking coefficients described above:

$$\begin{pmatrix} 1/\alpha \\ 1/\beta \\ 1/\gamma \end{pmatrix} = \begin{pmatrix} a11 & a12 & a13 \\ a21 & a22 & a23 \\ a31 & a32 & a33 \end{pmatrix} \begin{pmatrix} 1 \\ 1 \\ 1 \end{pmatrix} \quad (14)$$

where a11 through a33 are masking coefficients in the divided regions I through VI The smallest one of the equivalent achromatic densities C', M', Y' represents the density of the black component (undercolor), and is replaced with the black toner density K as follows:

$$K = min(C', M', Y') \quad (15)$$

where min( ) indicates a function to determine the smallest one of the values in the parentheses.

To remove the black component (undercolor) from the C, M, Y signals, the black component density may be subtracted from the equivalent achromatic densities, and the differences may be divided by the above coefficients, as follows:

$$C = (C' - K)/\alpha$$

$$M = (M' - K)/\beta$$

$$Y = (Y' - K)/\gamma \quad (16)$$

In this manner the undercolor removing process is carried out, and the C, M, Y, K signals are produced.

Figure 16A:
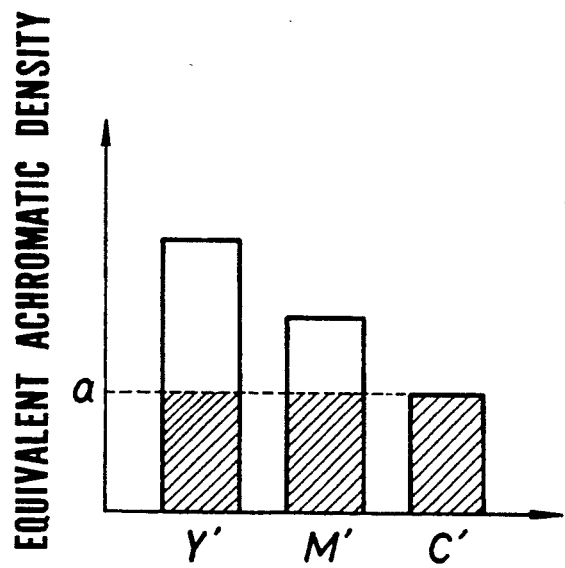
FIGS. 16A, 16B and 17A, 17B, 17C are diagrams illustrative of the manner in which the color reproduction processing circuit operates.
Figure 16B:
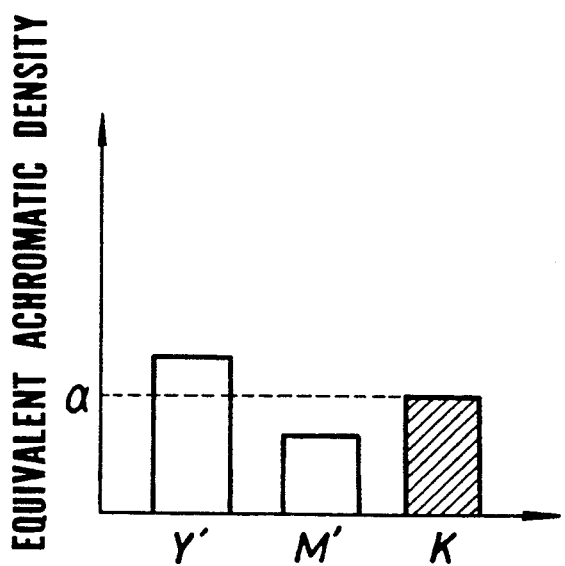

FIGS. 16A and 16B illustrate the undercolor removing process. In this embodiment, the cyan C having the minimum equivalent achromatic density (shown hatched in FIG. 6A) is used as a reference, and the equivalent achromatic densities C', M', Y' corresponding to the reference cyan density are removed. Then, as shown in FIG. 16B, the minimum cyan density is replaced with the black density K, thereby achieving 100% undercolor removal.

After the removal of the undercolor, the density levels are converted into toner deposit amounts M/A by a toner deposit amount converter 14, and then the toner deposit amounts M/A are corrected by a toner deposit amount corrector 16.

Figure 17A:
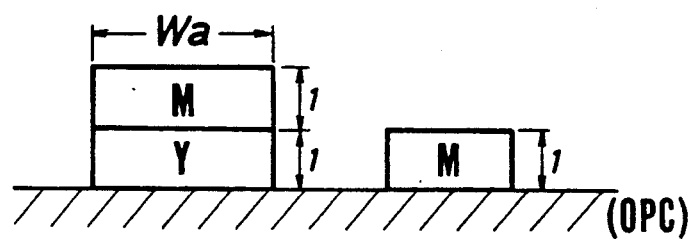
Figure 17B:
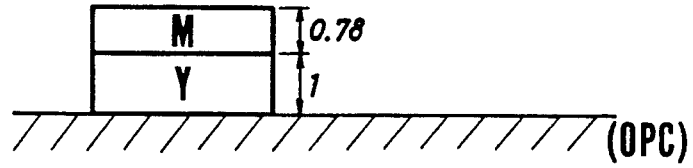
Figure 17C:
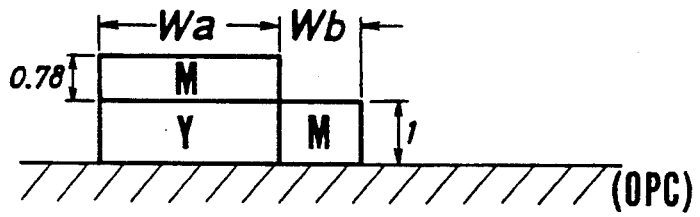

More specifically, as shown in FIGS. 17A, 17B, and 17C, when an image is recorded with superposed toners Y, M, for example, over a write pulse width Wa in the printer unit 84, it is desirable that the toners Y, M be deposited in the same amount (FIG. 17A). Actually, however, the amount by which toner M is deposited is about 78% of the amount by which it would be deposited by itself for monochromatic reproduction, as shown in FIG. 17B.

To avoid the above drawback, the write pulse width for depositing the toner M is increased by Wb in addition to the write pulse width Wa for depositing the toner Y, as shown in FIG. 17C, so that the toner M is deposited in the same amount by which it would be deposited by itself for monochromatic reproduction. In this manner, variations in the amount by which the toners are deposited on the photosensitive drum 142 can be corrected.

The C, M, Y, K signals which have been corrected with respect to the toner deposit amount are then applied to a selector 18 which selects one of the C, M, Y, K signals at a time.

As described above, the printer unit 84 scans one color image at a time, and successively produces developed color images in superposed relation on the photosensitive drum 142. The selector 18 is supplied with a 2-bit scan code and selectively supplies the C, M, Y, K signals in synchronism with the scanning cycle to the printer unit 84.

FIG. 18 show the linear masking circuit 20 by way of example.

If the color space is divided into six regions as shown in FIG. 13, then the linear masking circuit 20 has six linear masking units 21 through 26 which store six masking coefficients aij(I) through aij(VI), respectively. The C, M, Y, K signals from the linear masking units 21 through 26 are selected by a multiplexer 27. The input R, G, B signals are supplied to a region determining unit 28 which determines the region to which the input R, G, B signals belong. The region determining unit 28 applies an output signal to the multiplexer 27 to select the signals from the linear masking units 21 through 26. The linear masking circuit 20 may be in the form of a single ROM table.

Figure 19A:
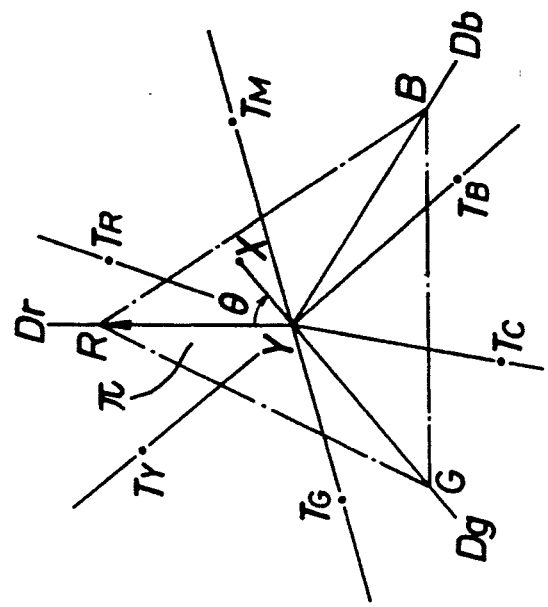
FIGS. 19A and 19B are diagrams showing the manner in which the linear masking circuit operates.

The region determining unit 28 is constructed as follows:

FIG. 19A shows a rectangular Cartesian coordinate system for the density levels Dr, Dg, Db. If the density signals from the scanner are indicated by Dr, Dg, Db, then their coordinates can be expressed by DRGB(OX) in this rectangular Cartesian coordinate system.

A plane $\pi$ contains a point X and lies perpendicularly to a vector $\overrightarrow{OY}$ which represents an achromatic density. If the achromatic vector OY has components r, g, b, then the components r, g, b are equal to each other as follows:

$$r = g = b = k \quad (17)$$

where k is a real number. Therefore, the vector OY can be expressed by:

$$\overrightarrow{OY} = (k,k,k) \quad (18).$$

If a point Y is contained in the plane $\pi$, the following condition is satisfied:

$$\overrightarrow{OY} \perp \overrightarrow{OY} \quad (19)$$

That is, the following equation is satisfied:

$$\overrightarrow{OY} \cdot \overrightarrow{YX} = 0 \quad (20).$$

If the components of the vectors are employed, then $$\overrightarrow{OY} \cdot (\overrightarrow{OX} - \overrightarrow{OY}) = 0$$

$$(k,k,k) \cdot \{(Dr,Dg,Db) - (k,k,k)\} = 0$$

$$(k,k,k) \cdot (Dr-k, Dg-k, Db-k) = 0$$

$$k\{Dr + Dg + Db - 3k\} = 0 \quad (21).$$

Since $k \neq 0$, $$k = (Dr + Dg + Db)/3 \quad (22).$$

Points in the plane $\pi$ meet the requirement (22) and corossing points R, G, B of the plane $\pi$ and an axis of coordinates are expressed as follows:

$$R(3k,0,0), G(0,3k,0), B(0,0,3k) \quad (23).$$

Figure 19B:
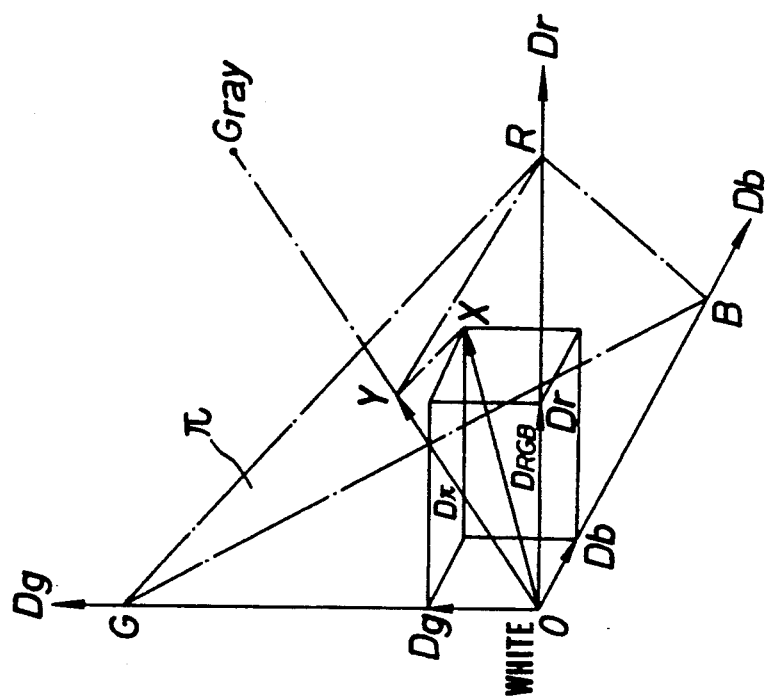

FIG. 19B shows the plane $\pi$ as it is viewed from a position on an extension of the vector $\overrightarrow{OY}$.

The points R, G, B, X, Y all lie on the plane $\pi$. If it is assumed that the point Y is regarded as the origin in FIG. 19B and the angle of the vector $\overrightarrow{YR}$ is 0, then the angle $\theta$ of the vector $\overrightarrow{YX}$ is given as follows:

i) when Dg > Db, $\theta = \cos^{-1}$ $$(\vec{YR} \cdot \vec{YX}/|\vec{YR}||\vec{YX}|) \quad (24),$$

ii) when $Dg < Db$, $\theta = -\cos^{-1}$ $$(\vec{YR} \cdot \vec{YX}/|\vec{YR}||\vec{YX}|) \quad (25).$$

By determining angles ∠RYTM, ∠RYTB, ... corresponding to the C, M, Y, R, G, B toner images in advance, and dividing the six regions I through VI by the determined angles, the six regions I through VI can be determined when the angle θ is determined from the input R, G, B signals and checked for its magnitude.

The marker color conversion circuit 30 serves to convert the color of a black character or characters which are enclosed by color markers on an original into the color or colors of the color markers.

FIGS. 20A and 20B shows a marker color conversion process. FIG. 20A shows an original before a marker color conversion process is effected, and FIG. 20B shows a recorded output image after a marker color conversion process is carried out. The black characters which are enclosed by color markers on the original shown in FIG. 20A appear a characters in the same colors as the color markers. The color markers are not limited to any particular colors.

Figure 21:
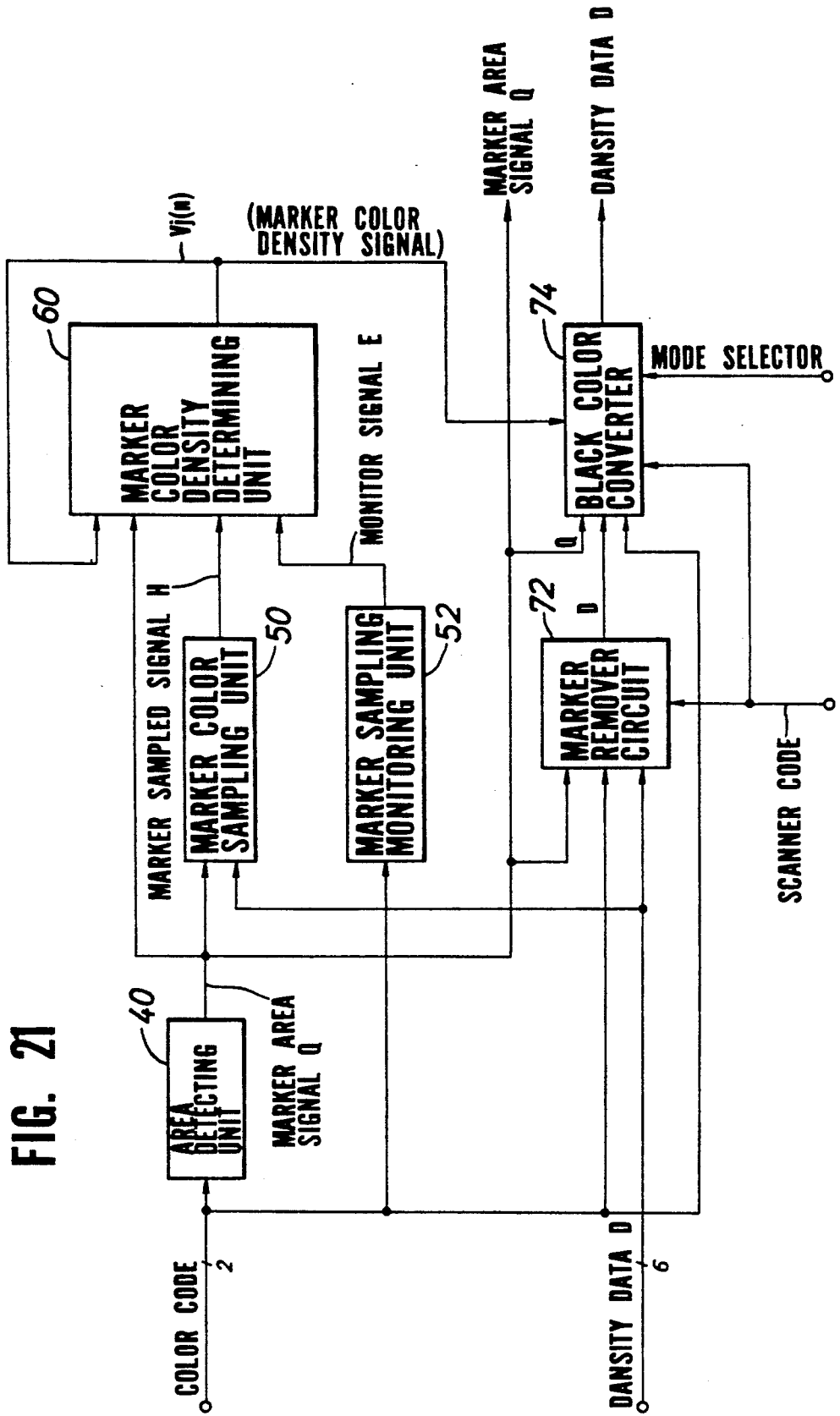
FIG. 21 is a block diagram of a marker color conversion circuit.

The marker color conversion circuit 30 is constructed as shown in FIG. 21.

The marker color conversion circuit 30 includes an area detector 40 for detecting a color marker MC and extracting an area enclosed by the color marker MC to produce a marker area signal Q. While the marker area signal Q is being produced, a marker color sampling unit 50 samples the density data of the color (which may be C, M, Y, or K) of the color marker MC to produce a sampled signal H of density data.

The marker color conversion circuit 30 also has a marker color density determining unit 60 for determining whether the sampled signal H is to be used directly as the density data of the marker MC. The marker color density determining unit 60 is supplied with the marker area signal Q, the sampled signal H, and a monitor signal E (described below).

A marker sampling monitoring unit 52 monitors the color code to determine whether the sampling of the marker MC is effective or not, and produces a monitor signal E indicative of the result of the monitoring process.

A marker remover circuit 72 serves to prevent a marker MC from being recorded. The marker remover circuit 72 is supplied with the color code, the density data D, the marker area signal Q, and the scan code.

The marker remover circuit 72 passes the input density data of black K while an image of black K is being recorded by the printer unit 84, and passes the density data of black K only in marker areas while an image of Y, M, C, K is being recorded by the printer unit 84. FIG. 22 shows a table of truth values for the scan codes.

The marker color conversion circuit 30 also includes a black color converter 74 for multiplying the input density data only in marker areas and passing the input black data in other areas than the marker areas.

The black color converter 74 is supplied with a marker color density signal V (described later), the density data D, the color code, the marker area signal Q, and the 2-bit scan code, and converts the black density data D in the marker areas enclosed by the markers MC into marker colors.

Figures 23, 24:
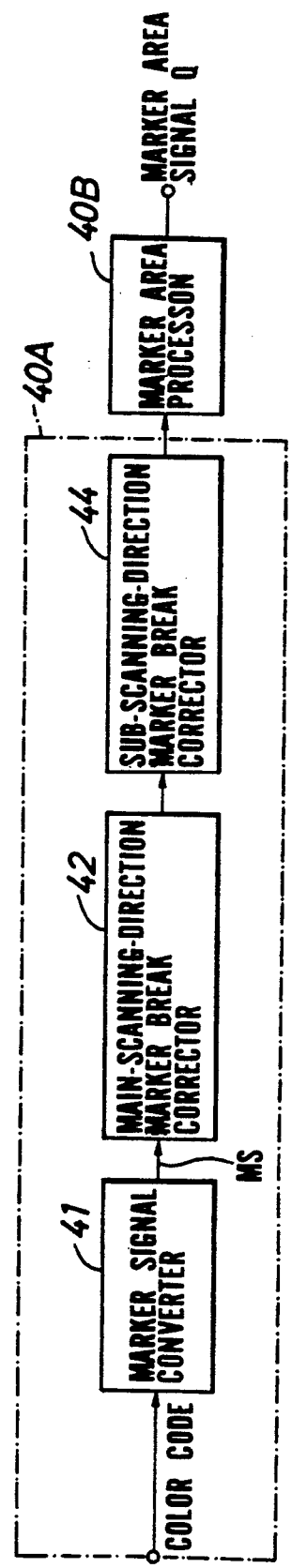

As shown in FIG. 23, the output density data produced by the black color converter 74 are the product of the input density data D and a coefficient V/Do (Do is a constant).

The components of the marker color conversion circuit 30 will hereinafter be described in more detail.

FIG. 24 shows the area detector 40 by way of example. The area detector 40 is composed of a marker break corrector 40A and a marker area processor 40B.

The marker break corrector 40A corrects a blur or break in the marker MC in both main and sub scanning directions. In the marker break corrector 40A, the color code is converted into a marker signal MS by a marker signal converter 41.

The marker signal converter 41 produces a marker signal MS when the color code indicates a chromatic code. The relationship between the color code and the marker signal MS is shown in FIG. 8. The marker signal MS is supplied to a main-scanning-direction marker break corrector 42.

Figure 25:
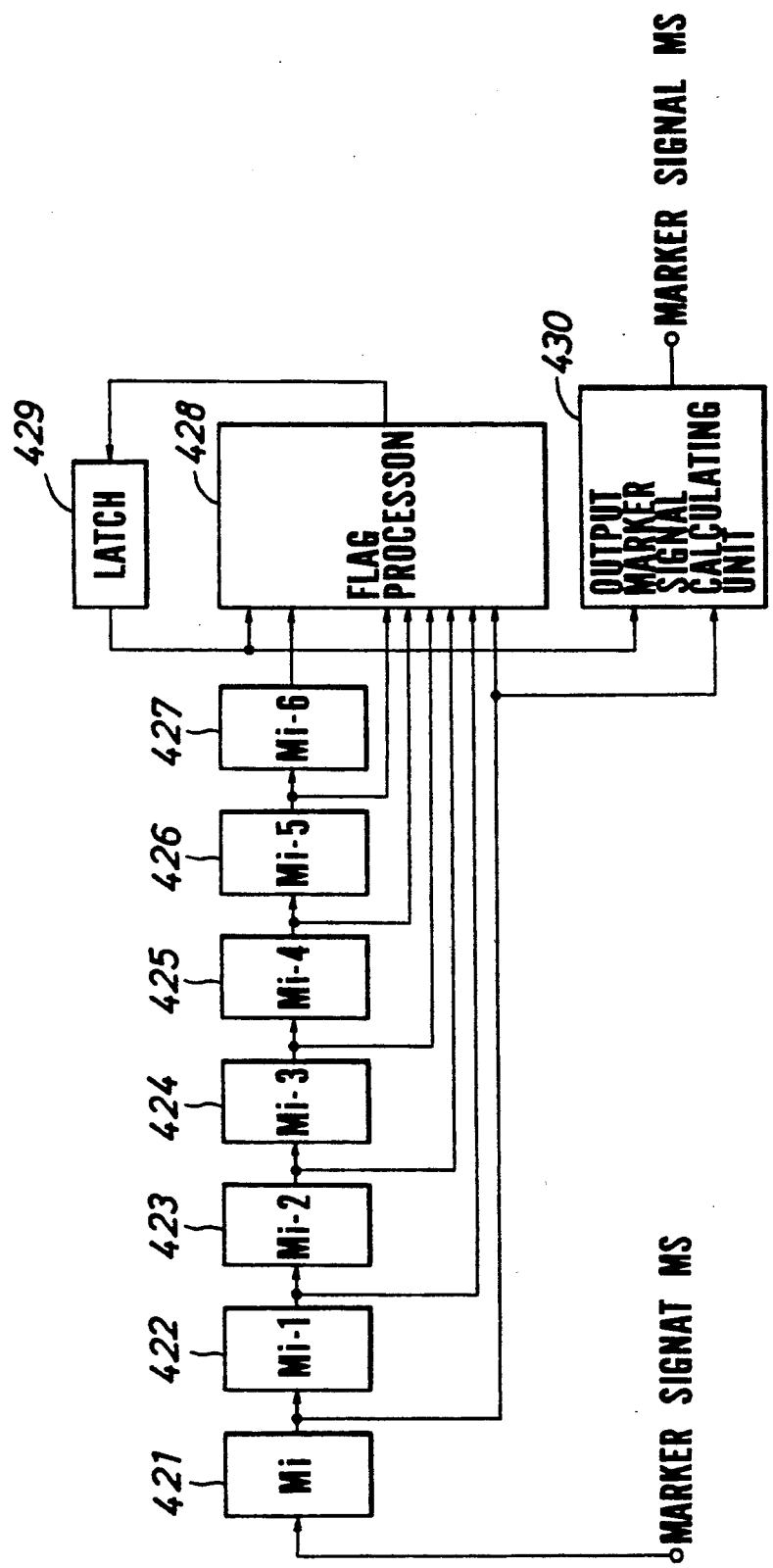
FIG. 25 is a block diagram of a main-scanning-direction marker break corrector.

FIG. 25 shows the main-scanning-direction marker break corrector 42 in specific detail. The main-scanning-direction marker break detector 42 comprises a plurality of (seven in the illustrated embodiment) single-pixel delay elements 421 through 427 connected in cascade. The delay elements 421 through 427 apply their respective output signals to a flag processor 428. When all of the output signals from the delay elements 421 through 427 become "1", then the flag processor 428 sets a marker continuity flag to "1" which is latched by a latch 429.

The marker continuity flag latched by the latch 429 is supplied to the flag processor 428 and an output marker signal calculating unit 430, which is also supplied with the output signal Mi from the first delay element 421. The output marker signal calculating unit 430 is in the form of a logic OR circuit for producing an output marker signal MS of "1" when either the marker continuity flag or the output signal Mi is "1".

The main-scanning-direction marker break corrector 42 of the illustrated circuit arrangement can compensate for a marker break, corresponding to at least seven pixels, in the main scanning direction.

After a marker break in the main scanning direction has been corrected, any marker break in the sub scanning direction is compensated for by a next sub-scanning-direction marker break corrector 44 in the same manner as described above with respect to the main-scanning-direction marker break corrector 42. In the illustrated embodiment, the sub-scanning-direction marker break corrector 44 is effective to compensate for a marker break corresponding to at least seven scanning lines.

The marker area processor 40B generates a marker area signal Q corresponding to an area enclosed by the marker signal MC. Operation of the marker area processor 40B will be described below with reference to FIGS. 26, 27A, and 27B.

Figure 26:
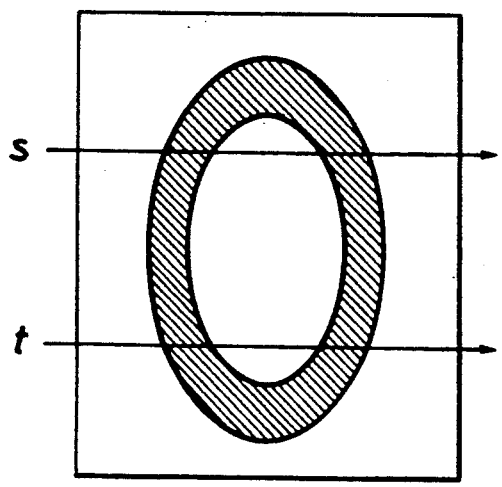
FIG. 26 is a diagram illustrating a marker area.
Figure 27A:
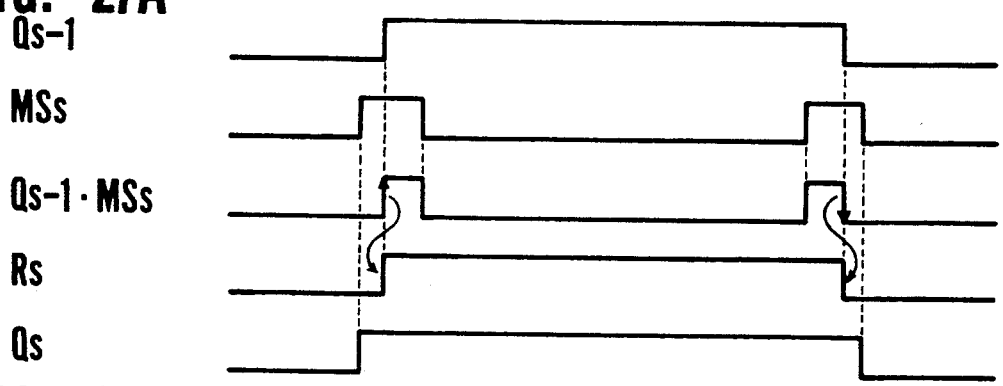

When a marker area is scanned along a scanning line s as shown in FIG. 26, a marker signal MSs is produced as shown in FIG. 27A. It is assumed that when the marker area is scanned along a preceding scanning line s-1 (not shown in FIG. 26), a marker signal Qs-1 is produced as shown in FIG. 27A.

The marker signal Qs-1 and the marker signal MSs are ANDed to produce a signal Qs-1×MSs. An edge-detecting pulse Rs extending from a positive-going edge of the signal Qs-1×MSs to a negative-going edge of the same signal is then produced. The marker signal MSs and the edge-detecting pulse Rs are then ORed to produce a logic OR signal Qs, which is employed as a marker area signal Q for the present scanning line s.

Figure 27B:
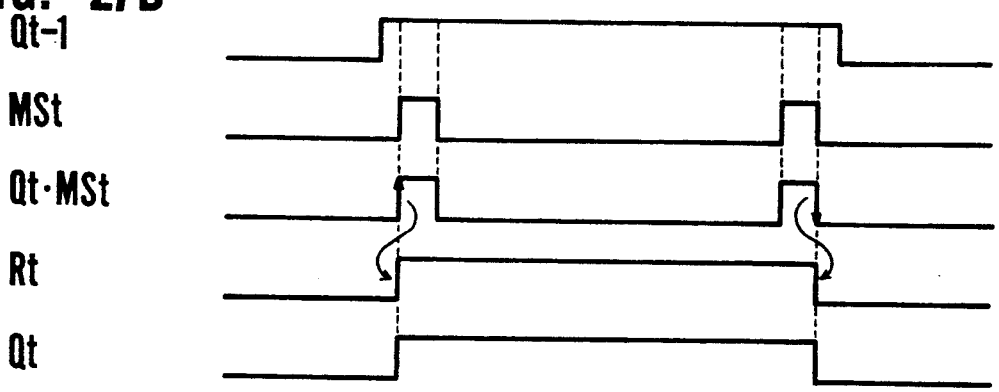

Likewise, when the marker area is scanned along a scanning line t as shown in FIG. 26, a marker signal MSt is produced as shown in FIG. 27B. It is assumed that when the marker area is scanned along a preceding scanning line t-1 (not shown in FIG. 26), a marker signal Qt-1 is produced as shown in FIG. 27B.

The marker signal Qt-1 and the marker signal MSt are ANDed to produce a signal Qt-1×MSt. An edge-detecting pulse Rt extending from a positive-going edge of the signal Qt-1×MSt to a negative-going edge of the same signal is then produced. The marker signal MSt and the edge-detecting pulse Rt are then ORed to produce a logic OR signal Qt, which is employed as a marker area signal Q for the present scanning line t.

The marker area is detected in the above manner. Then, it is necessary to sample the color data of the marker.

In this embodiment, to obtain stable color data, the density level of the marker is sampled for each of four consecutive pixels, the first pixel of which is four pixels spaced from an edge of the marker (FIGS. 28A and 28B), and the average of the density levels of the sampled pixels is used as a sampled signal H (density data) for the C, M, Y, K colors in the marker signal MS (FIG. 28C).

The marker sampling monitoring unit 52 shown in FIG. 21 makes a sampling process in the marker color sampling unit 50 effective when the marker signal MS contains no achromatic color code.

The marker sampling monitoring unit 52 produces a monitor signal E which makes the sampling process effective only when there is an achromatic color code outside of the marker signal MS, as shown in FIGS. 28D through 28G.

Figure 29:
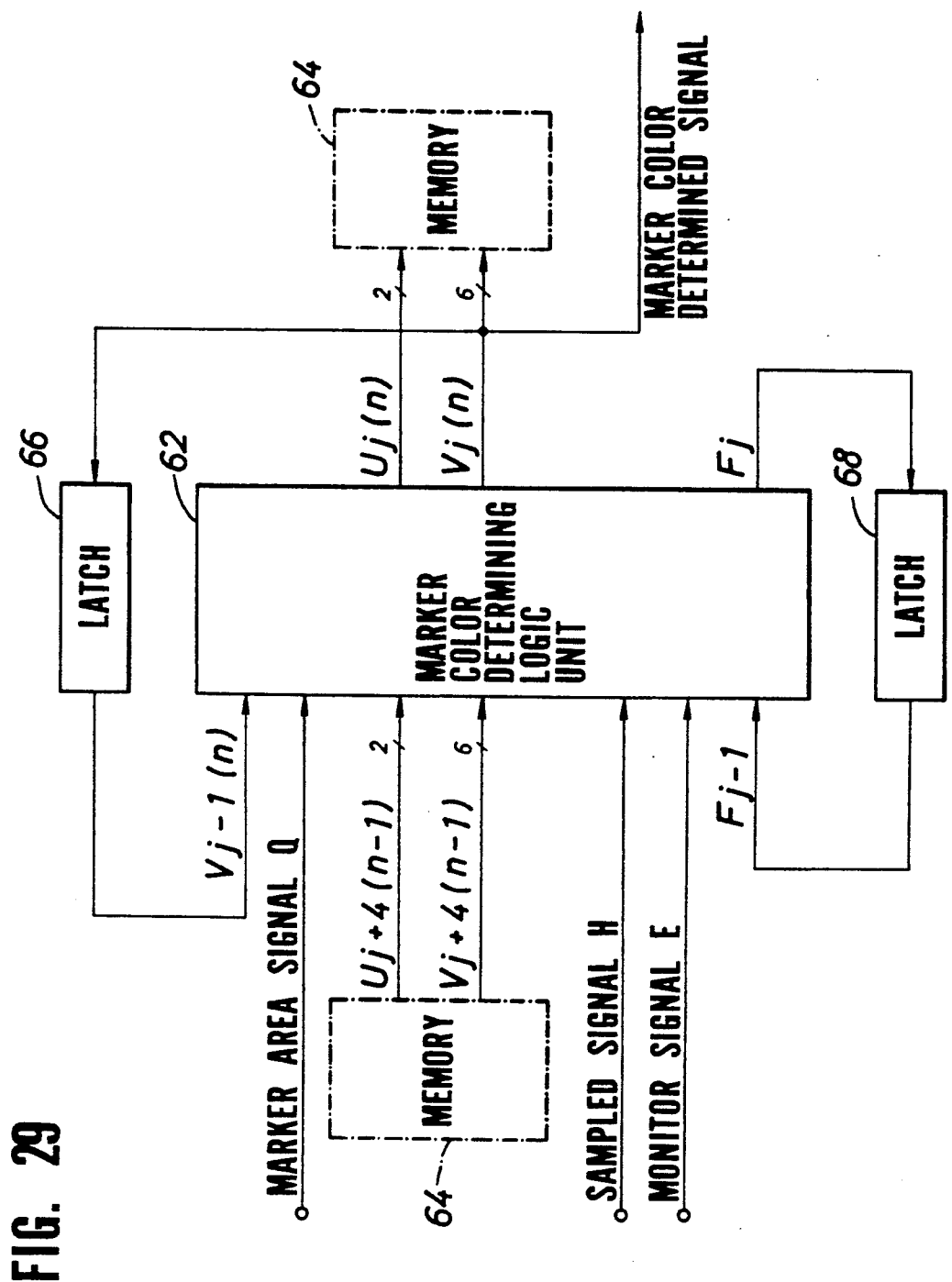
FIG. 29 is a block diagram of a marker color density determining device.

The marker color density determining unit 60 is constructed as follows:

As shown in FIG. 29, the marker color density determining unit 60 comprises a marker color density determining logic unit 62, a memory 64 for writing and reading data within the period of one pixel, and a pair of latches 66, 68. For an easier understanding of the writing and reading operation of the memory 64, the memory 64 is shown as two memories in FIG. 29, but actually only one memory 64 is employed in the marker color density determining unit 60.

Denoted in FIG. 29 at U is the count of a 2-bit counter, V the density data of the marker color, n a scanning line, j a pixel number, and F a flag indicative of whether the density data of the marker color are determined or not.

The marker color determining logic unit 62 is supplied with:

(1) the marker area signal Q;
(2) the sampled signal H;
(3) the monitor signal E;
(4) the flag F;
(5) the count U read from the memory 64; and
(6) the density signals V for the preceding scanning line read from the memory 64.

In response to these supplied signals, the marker color determining logic unit 62 produces:

(7) the count U for the present scanning line, to be written into the memory 64; and
(8) the density signal V for the present scanning line, to be written into the memory 64.

Conditions in which the density of the marker MC is determined will be described below. In the following description, it is assumed that the data for the third scanning line from a starting end of the marker area are regarded as data for the marker MC.

(I) When $Q = 0$:

At this time, since the marker area is not scanned, no color conversion is necessary. Thus, the data:

$$V_j(n) = 0, \text{ and}$$

$$Vj(n) = 0$$

are written, and the flag is $$Fj = 0.$$

(II) When $Q = 1$, $U_j + 4(n-1) < 3$, $Fj = 0$:

When the marker MC is scanned along the first scanning line and the sampling of the pixels starting with the fourth pixels is effective, the monitor signal is $E = 1$ from the ninth pixel. Therefore, $$U_j(n) = U_j + 4(n-1) + 1, \text{ and}$$

$$Vj(n) = H$$

are written, and the flag is $$Fj = 0.$$

Thus, the data $U_j + 4(n-1) + 1$ which is produced when the counter output is incremented by 1 are stored as the counter output $U_j(n)$ for the present scanning line n. Since the density data are stored for the first time, the density data $V_j(n)$ of the sampled signal H are stored per se.

Figure 3:
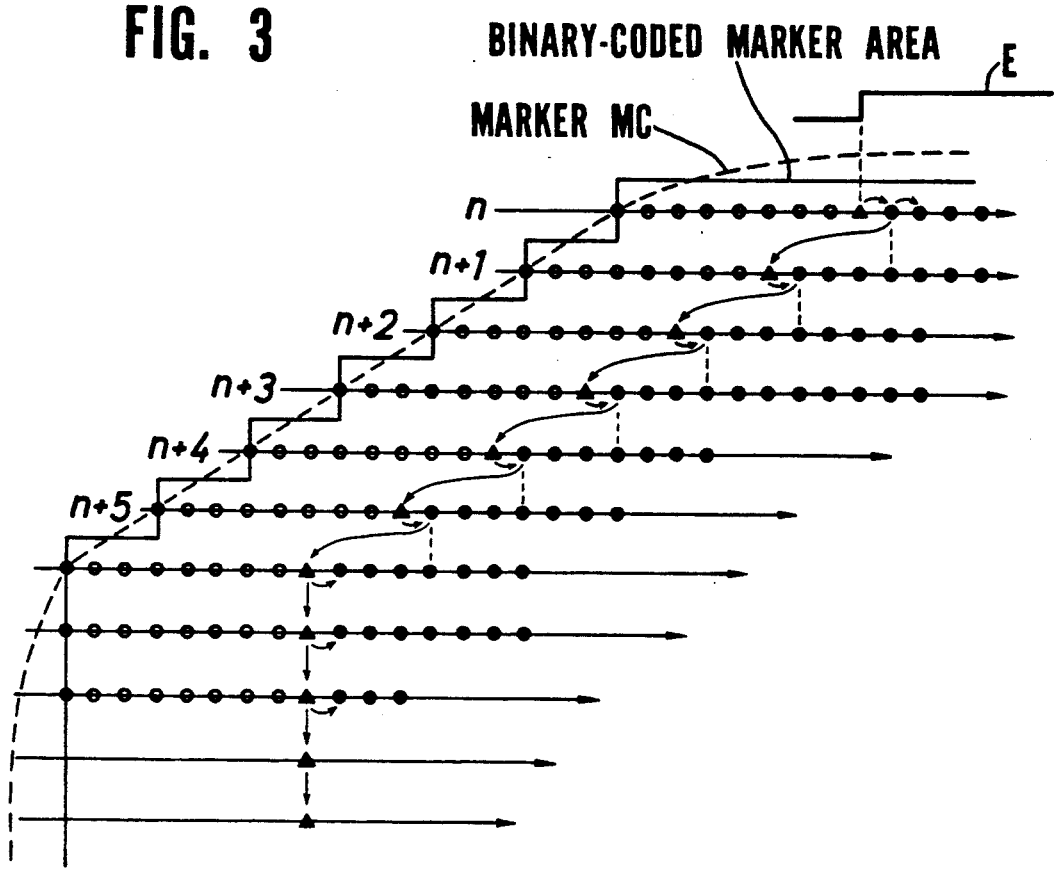

Accordingly, the density data (average) which are produced from the ninth pixel are stored as shown in FIG. 3.

For the subsequent pixels, the density data $V_j(n)$ of the sampled signal H are also stored per se.

Inasmuch as the density data along the third scanning line are employed, the density data of the marker MC have not been determined yet ($Fj=0$) at this time.

Because $Q=0$ outside of the marker area, the equations under the condition (I) above are employed outside of the marker area, and the density data remain undetermined.

In FIG. 3, circles represent pixels on the scanning lines, and triangles at pixels on the scanning lines indicate the density data of those pixels. The first pixel which is marked with the triangle on each scanning line is the ninth pixel. The solid circles indicate that the densities of the pixels marked with those solid circles are used as density data.

(III) When $Q=1$, $U_j + 4(n-1) < 3$, $E=1$, $Fj=1$:

For the tenth and following pixels on the same nth scanning line, the density data at the respective pixels are stored. Therefore, $$U_j(n) = U_j + 4(n-1) + 1, \text{ and}$$

$$Vj(n) = H$$

are written, and the flag is
$$Fj = 1.$$

Accordingly, the density data (average) at the respective pixels are stored as shown in FIG. 3. This operation continues until the scanned position goes outside of the marker area along the same nth scanning line.

(IV) When Q=1, Uj+4(n−1)=3, Fj=0:

On the (n+3)th scanning line, i.e., the fourth scanning line, the density data of the pixel which is four pixels behind the same pixel on the preceding scanning line are stored as the density data of the present scanning line. The density data thus stored will be employed as determined density data. Therefore, $$Uj(n) = Uj+4(n-1) \ (=3), \text{ and}$$

$$Vj(n) = Vj+4(n-1)$$

are written, and the flag is
Fj=1.

In FIG. 3, the density data of the pixel which is four pixels behind the same pixel on the preceding scanning line are the density data of the ninth pixel on the (n+2)th scanning line.

The tenth and following pixels on the same nth scanning line are as follows: Since the density data are determined at the ninth pixel, as described above, the flag becomes Fj=1, and the equations under the following condition (V) are employed:

(V) When Q=1, Fj=1:

For the tenth and following pixels on the same scanning lines, the density data Vj−1 which have been determined at the preceding pixel are employed as they are.

Therefore, $$Uj(n) = 3 \ (=Uj+4(n-1)), \text{ and}$$

$$Vj(n) = Vj-1(n)$$

are written, and the flag is
Fj=1.

On the same line, the density data determined at the ninth pixel are propagated in the scanning line.

Outside of the marker area, the density data of the pixels are undetermined (Fj=0). As a result, the equations under the condition (II) are employed for the next scanning line. For the ninth pixel on the next line, the density data which are four pixels ahead of the same pixel on the preceding line (i.e., the determined density data) are employed as the density data.

Since the flag is Fj =1 at the ninth pixel, the density data at the tenth and subsequent pixels are processed according to the equations under the condition (V). On this scanning line, the density data at the ninth and following pixels are propagated in the scanning direction.

Propagation of the density data will be explained with reference to FIG. 3.

A marker area appears at line (n) and following lines and data processing starts.

(1) line (n)

Sampling becomes effective at the pixel indicated by a solid triangle. At line (n−1), $U_{j+4(n-1)}<3$ and $F_j=0$ and then sampled value will be "H".

(2) line (n+1)

At line (n), $U_{j(n)}$ is incremented by 1 and is "1" in the marker area. Therefore, the density data will be the one sampled at the pixel indicated by the solid triangle.

(3) line (n+2)

At line (n+1), $U_{j(n+1)}$ is incremented by 1 and is "2" in the marker area. Therefore, the density data will be the one sampled at the pixel indicated by the solid triangle.

(4) line (n+3)

At line (n+2), $U_{j(n+2)}$ is incremented by 1 and is "3" in the marker area. Therefore, the density at the pixel indicated by the solid triangle will be the value of $V_{j+4(n+2)}$ at line (n+2) in the condition (IV). Then $F_j=1$ and the density at the next pixel will be the value at the pixel indicated by the solid triangle and will propagate in the main scanning direction.

Figure 30:
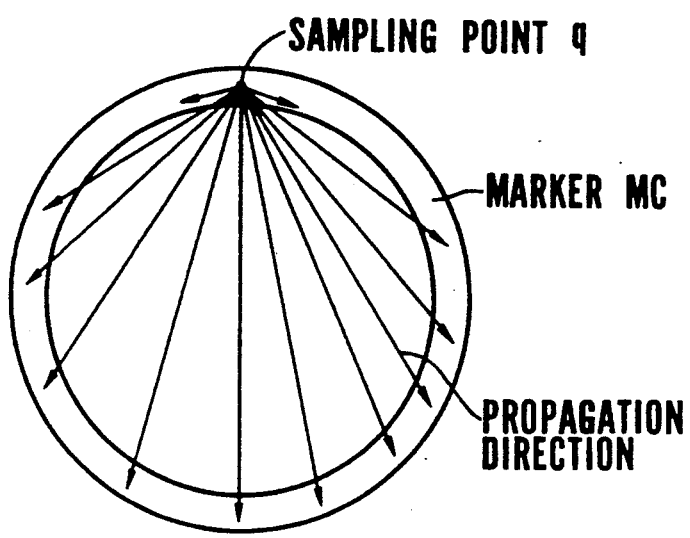
FIGS. 30 through 34 are diagrams showing a marker color density determining process.

As shown in FIG. 30, the determined density data are propagated in the scanning direction, and only the density data which have been determined at first on the preceding line are propagated to the next scanning line in the sub scanning direction.

Figure 1:
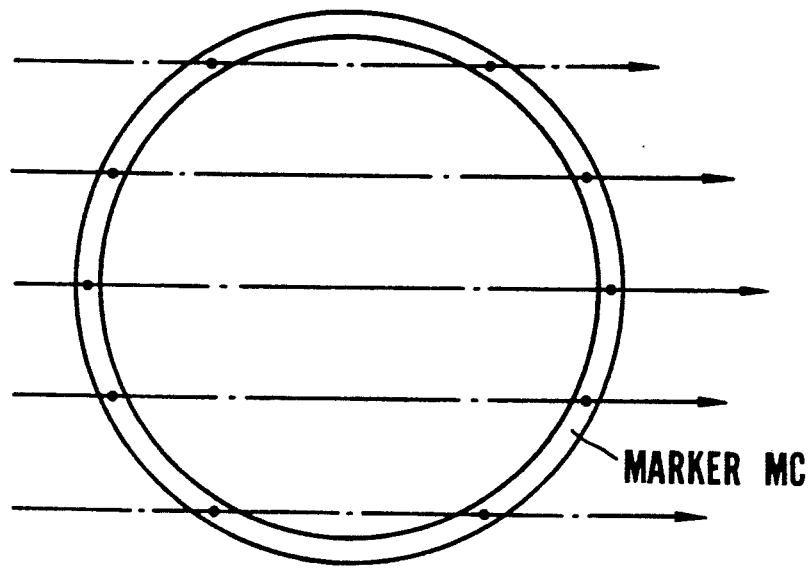
FIGS. 1 through 4 are diagrams illustrative of the manner in which a marker color density is determined.
Figure 2:
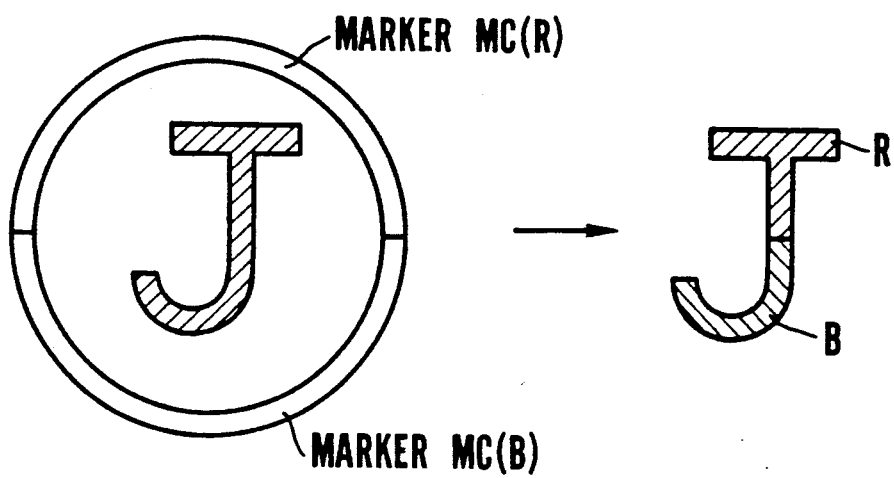

As a consequence, even when different marker colors are used as shown in FIG. 2, the color and density data of the marker MC which are determined at first are propagated through the entire marker area.

Figure 4:
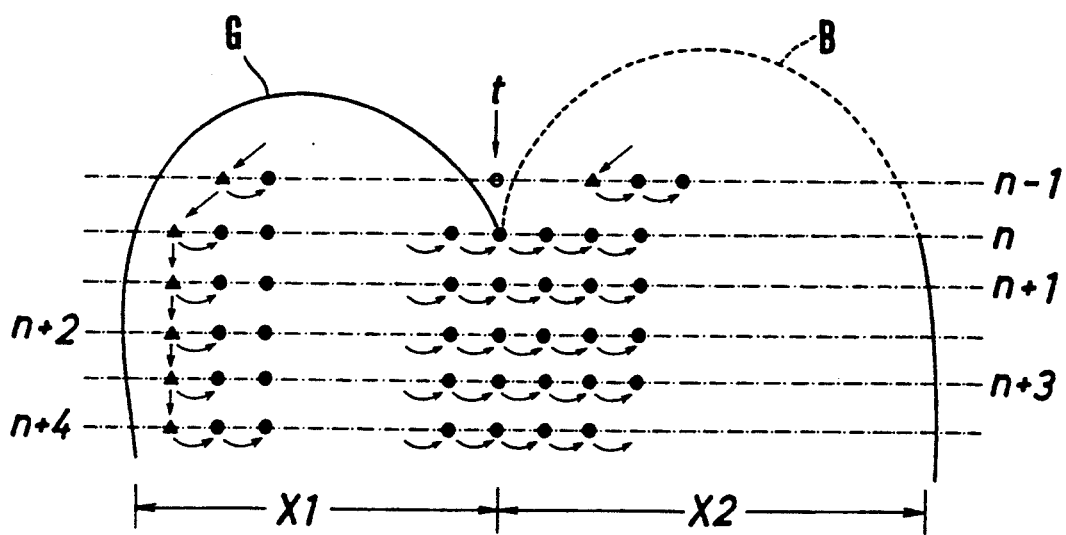
Figure 31:
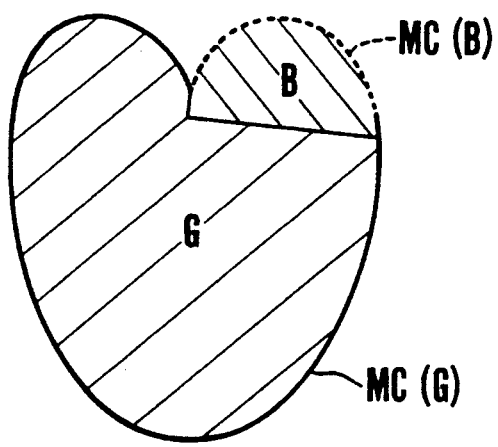
Figure 32:
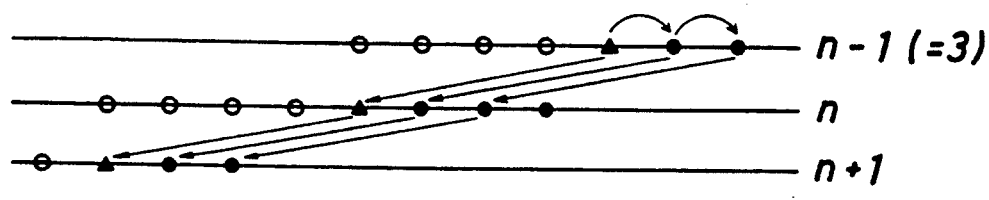

In the event that markers MC are applied in a special manner as shown in FIG. 31, i.e., in the event that a solid-line area is marked with a G marker MC and a broken-line area is marked with a different marker MC such as a B marker MC, the marker area is printed as follows:

As shown in FIG. 4, the marker area is broken between intervals X1, X2. In the interval X1, the marker color is green, and the density data determined in the first region are propagated successively to the subsequent lines. In the interval X2, the marker color is blue, and the density data determined in the first region are propagated successively to the subsequent lines.

Since the density data at the pixel t are not determined on the nth scanning line, the sampled signal H at that pixel are employed as the density data up to the (n+2)th scanning line according to the equations under the condition (III).

On the (n+3)th scanning line, the density data of the preceding line are employed even at the pixel t according to the equations under the condition (II). Thus, the marker colors and density data which are different in the intervals X1, X2 are propagated in the main and sub scanning directions up to the (n+3)th scanning lines.

On the next (n+4)th scanning line, the density data are determined according to the equations under the condition (V), so that the marker color and the density data which have been determined in the interval X1 are propagated to the interval X2.

As a consequence, as shown in FIG. 4, the region which is scanned with the marker color determined at first in the interval X2 is only the interval X2, up to the (n+3)th scanning line.

Therefore, most of the region is scanned with the marker color and the density data which have been determined in the interval X1.

The color region can be defined line by line in the above manner because the density data for the next scanning line are propagated from the preceding line as shown in FIG. 3 and propagated in the scanning direction.

In case the density data which are four pixels behind on the preceding scanning line are employed as the density data for the respective pixels on the next scanning line, the marker color and the density data are not established as shown in FIG. 31 even if the density data of the preceding scanning line are used as the first density data for the next scanning line.

Figure 33:
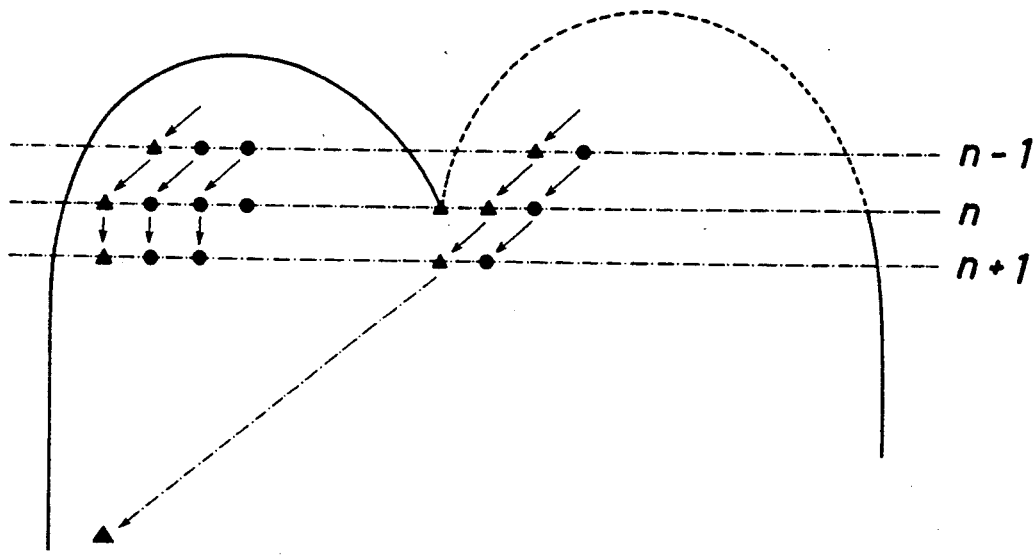

Insofar as the density data which are four pixels behind on the preceding scanning line are employed as the density data for the respective pixels on the next line, since the density data are propagated as shown in FIG. 33, the density data in the interval S2 enter the interval X1, and continue until the propagated density data are employed as the first density data in the interval X1.

Figure 34:
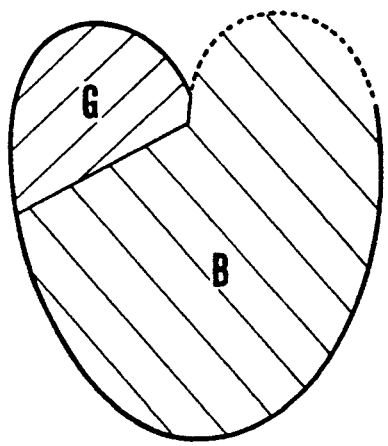

Eventually, the marker color and the density data are finalized as shown in FIG. 34, resulting in elimination of the marker color specified in the interval X1. This process is not effective enough to determine the marker color.

As described above, the density data ($=r1$) sampled at the point r on the third scanning line are propagated in the main and sub scanning directions. Consequently, the density data on the third scanning line are employed as the density data of the marker MC.

The density of the marker MC are thus determined on the third scanning line. Even if the color of the marker MC is changed or the density thereof is reduced somewhere in the marker MC, the marker area can be processed irrespective of the changes in the color and density of the marker MC.

(VI) When $Q=1$, $Uj+4(n-1)<3$, $E=0$, $Fj=0$:

When the sampling process is not effective and the flag F is not determined up to the third line (such a case is actually rare), i.e., when $E=0$, $Fj=0$, the density data of the preceding line are stored as follows:

$$Uj(n)=Uj+4(n-1), \text{ and}$$

$$Vj(n)=Vj+4(n-1),$$

and the flag is $Fj=0$.

The present invention has been described as being applied to a color copying machine. However, the color image processing apparatus according to the present invention may be incorporated in various systems for processing various color images.

With the present invention, as described above, the color and density of a marker are determined using data on a particular scanning line, and are employed as the color and density data of the marker area.

Since the image in the area enclosed by the marker is not recorded in a plurality of colors or the image recorded in the marker color does not suffer density irregularities, the quality of the recorded image is improved.

Even if a marker is designated in a special plotting manner, the marker area is not unduly divided.

Although a certain preferred embodiment has been shown and described, it should be understood that many changes and modifications may be made therein without departing from the scope of the appended claims.

What is claimed is:

1. A color image processing apparatus comprising:
   image reading means for reading an original image having multiple pixels in a first scanning direction and a second scanning direction as three color-separated images, said first scanning direction being perpendicular to said second scanning direction;
   color code generating means for generating a color code indicating whether each pixel of said original image is white, black, or chromatic;
   color reproducing means for generating density data for each pixel corresponding to each of a plurality of recording colors based on said color-separated images;
   marker area detecting means for detecting a marker on said original image based on the color codes generated by said color code generating means, and for extracting a marker area enclosed by said marker;
   means for sampling density data at pixels on said marker at sampling points located a selected distance, corresponding to a predetermined number of pixels, inside an edge of said marker, and for determining density data of said marker based on said sampled density data;
   means for converting density data of pixels on a line oriented in said first scanning direction within said marker area into said determined density data, said determined density data being determined from a first marker along said line when said marker area is continued in said first scanning direction; and
   marker remover means for removing said marker from said original image based on the color codes generated by said color code generating means.

2. A color image processing apparatus according to claim 1 wherein said color reproducing means includes a linear masking circuit for reproducing color.

3. A color image processing apparatus according to claim 2 wherein said linear masking circuit is composed of ROM table.

4. A color image processing apparatus according to claim 1 wherein said marker area detecting means comprises marker signal generating means for generating a marker signal corresponding to the chromatic color code signal from said color code generating means, a marker break correction means for correcting said marker signal corresponding to a blur or break in a marker portion, and a marker area processing means for generating a marker area signal representative of an area defined by said marker signal.

5. A color image processing apparatus according to claim 4 wherein said density data sampling means includes a marker color sampling unit for sampling the density data of the marker color while a marker area signal indicating said marker area is provided; a marker sampling monitoring unit for producing a monitor signal based on the color codes, and density data determining means for determining the density of the marker color on the basis of the marker area signal, the sampled density data and the monitor signal.

* * * * *

UNITED STATES PATENT AND TRADEMARK OFFICE
CERTIFICATE OF CORRECTION

PATENT NO. : 5,241,609
DATED : August 31, 1993
INVENTOR(S) : Takashi Hasebe et al.

It is certified that error appears in the above-indentified patent and that said Letters Patent is hereby corrected as shown below:

On the title page, item (75): after "Inventors", insert the name --Kazuyoshi Tanaka;--before "Koji Washio"

Signed and Sealed this

Twenty-eighth Day of June, 1994

*Attest:*

BRUCE LEHMAN

*Attesting Officer*     *Commissioner of Patents and Trademarks*